US011799789B2

United States Patent
Shrestha et al.

(10) Patent No.: US 11,799,789 B2
(45) Date of Patent: Oct. 24, 2023

(54) TIMING ADJUSTMENT IN NON-TERRESTRIAL WIRELESS COMMUNICATIONS

(71) Applicant: QUALCOMM Incorporated, San Diego, CA (US)

(72) Inventors: Bharat Shrestha, San Diego, CA (US); Xiao Feng Wang, San Diego, CA (US); Umesh Phuyal, San Diego, CA (US); Alberto Rico Alvarino, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 17/188,943

(22) Filed: Mar. 1, 2021

(65) Prior Publication Data

US 2021/0281520 A1    Sep. 9, 2021

Related U.S. Application Data

(60) Provisional application No. 62/987,216, filed on Mar. 9, 2020.

(51) Int. Cl.
*H04L 47/283* (2022.01)
*H04B 7/185* (2006.01)

(52) U.S. Cl.
CPC ....... *H04L 47/283* (2013.01); *H04B 7/18513* (2013.01)

(58) Field of Classification Search
None
See application file for complete search history.

(56) References Cited

U.S. PATENT DOCUMENTS

| 5,809,397 | A | * | 9/1998 | Harthcock | H04B 7/2125 455/260 |
| 2015/0245402 | A1 | * | 8/2015 | Mochizuki | H04W 36/22 370/328 |

(Continued)

FOREIGN PATENT DOCUMENTS

WO    WO-2021166267 A1 *  8/2021

OTHER PUBLICATIONS

Dish Network: "On Timing Advance for NTN", 3GPP Draft, 3GPP TSG RAN WG1 Meeting #96Bis, R1-1905215, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051700290, 3 Pages, Retrieved from the Internet: URL: http://www.3gpp.org/ftp/Meetings%5F3GPP%5FSYNC/RAN1/Docs/R1%2D1905215%2Ezip. [retrieved on Apr. 7, 2019] sections 2.2-2.3.

(Continued)

*Primary Examiner* — Minh Trang T Nguyen
(74) *Attorney, Agent, or Firm* — Holland & Hart LLP

(57) ABSTRACT

Methods, systems, and devices for wireless communications are described in which UEs may communicate with satellites and base stations or gateways in a non-terrestrial network (NTN). Due to the large distances between transmitting devices and receiving devices in a NTN, timing adjustments to account for propagation delay communications links via a satellite may include a propagation delay between a UE and a satellite, a propagation delay between a base station and a satellite, as well as a variation in the propagation delays due to movement of the satellite. In accordance with various techniques discussed herein, a UE may account for variation in propagation delay, in addition to determined (Continued)

propagation delay, when determining an uplink timing for uplink communications via a satellite.

43 Claims, 18 Drawing Sheets

(56) References Cited

U.S. PATENT DOCUMENTS

| | | | |
|---|---|---|---|
| 2019/0313357 A1 | 10/2019 | Wang et al. | |
| 2019/0394770 A1 | 12/2019 | Wang et al. | |
| 2021/0250885 A1* | 8/2021 | Medles | H04L 27/0014 |
| 2022/0191898 A1* | 6/2022 | Sergeev | H04W 74/0833 |
| 2022/0240262 A1* | 7/2022 | Xu | H04B 7/1851 |

OTHER PUBLICATIONS

International Search Report and Written Opinion—PCT/US2021/020528—ISA/EPO—dated Jun. 17, 2021.

Panasonic: "Timing Advance and RACH for NTN", 3GPP Draft, 3GPP TSG RAN WG1 #98bis, R1-1911004, NTN TA and RACH, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808304, 12 Pages, Retrieved from the Internet: URL: https://ftp.3gpp.org/tsg_ran/WG1_RL1/TSGR1_98b/Docs/R1-1911004.zip. R1-1911804, NTN TA and RACH.docx [retrieved on Oct. 4, 2019] section 2.

PCL: "Discussion on Timing Advance and RACH for NTN", 3GPP Draft, 3GPP TSG RAN WG1 Meeting #98-Bis, R1-1910864, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 3, 2019 (Oct. 3, 2019), XP051808053, 4 Pages, Retrieved from the Internet: URL: https://ftp.3gpp.org/tsg_ran/WG1_RL1/TSGR1_98b/Docs/R1-1910864.zip. R1-1910864.docx [retrieved on Oct. 3, 2019] section 2.1.

Sony: "Discussion on Uplink Timing Advance and RACH Procedure", 3GPP Draft, 3GPP TSG RAN WG1 #98, R1-1908775, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765383, 4 Pages, Retrieved from the Internet: URL: http://www.3gpp.org/ftp/tsg_ran/WG1_RL1/TSGR1_98/Docs/R1-1908775.zip. [retrieved on Aug. 17, 2019] section 2, section 2.1, section 2.2; pp. 1-3.

* cited by examiner

US 11,799,789 B2

TIMING ADJUSTMENT IN NON-TERRESTRIAL WIRELESS COMMUNICATIONS

CROSS REFERENCE

The present Application for Patent claims the benefit of U.S. Provisional Patent Application No. 62/987,216 by Shrestha et al., entitled "TIMING ADJUSTMENT IN NON-TERRESTRIAL WIRELESS COMMUNICATIONS," filed Mar. 9, 2020, assigned to the assignee hereof, and expressly incorporated by reference in its entirety herein.

FIELD OF TECHNOLOGY

The following relates generally to wireless communications and more specifically to timing adjustment in non-terrestrial wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, there may be a large distance between a UE and a serving node of the UE, such as when a gateway or base station and the UE are a part of a non-terrestrial network (NTN). Because of the distance between UEs and gateways in such cases, there may be a relatively long round trip delay or propagation delay in message transmissions between a UE and gateway (e.g., relative to terrestrial networks). Efficient techniques for managing communications with such relatively long round trip or propagation delays are thus desirable for such systems.

SUMMARY

The described techniques relate to improved methods, systems, devices, and apparatuses that support timing adjustment in non-terrestrial wireless communications. In accordance with various aspects, timing adjustments to account for propagation delay in a non-terrestrial network (NTN) may include a propagation delay between a user equipment (UE) and a satellite, as well as a variation in the propagation delay due to movement of the satellite. For example, due to relatively high velocity of the satellite relative to the UE or to a serving gateway (e.g., which may be an example of a base station) in communication with the UE via the satellite, a round trip delay (RTD) (e.g., that is used to determine a timing advance for aligning uplink communications from the UE with a receiving device timing reference) may change relatively quickly. In accordance with various techniques discussed herein, a UE may account for variation in propagation delay, in addition to determined propagation delay, when determining an uplink timing for uplink communications via the satellite.

In some cases, a gateway may configure the UE to use a gateway timing reference, and thus the UE may adjust uplink transmission timing such that uplink transmissions from the UE to the gateway arrive at the gateway with a time alignment that corresponds to a frame boundary as measured by the gateway timing reference. In some such cases, the UE may determine an RTD associated with communications with the gateway that accounts for one or more of a UE-to-satellite propagation delay, a UE-to-satellite propagation delay variation, a satellite-to-gateway propagation delay, or a satellite-to-gateway propagation delay variation. In some cases, the gateway may provide signaling to the UE that includes RTD and RTD variation information that may be used to determine the uplink timing. In other cases, the UE may determine one or more of the RTD or RTD variation information. In some cases, the gateway may configure the UE to use a satellite timing reference, and thus the UE may adjust uplink transmission timing to provide that uplink transmissions from the UE to the satellite arrive at the satellite with a time alignment that corresponds to a frame boundary as measured by the satellite timing reference.

A method of wireless communication at a UE is described. The method may include identifying, based on round trip delay information received from a network, a propagation delay for communications between the UE and a base station via a satellite, determining, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to one or more of the UE or the base station, and transmitting the uplink communication to the base station via the satellite based on the uplink timing.

An apparatus for wireless communication at a UE is described. The apparatus may include a processor, memory coupled with the processor, and instructions stored in the memory. The instructions may be executable by the processor to cause the apparatus to identify, based on round trip delay information received from a network, a propagation delay for communications between the UE and a base station via a satellite, determine, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to one or more of the UE or the base station, and transmit the uplink communication to the base station via the satellite based on the uplink timing.

Another apparatus for wireless communication at a UE is described. The apparatus may include means for identifying, based on round trip delay information received from a network, a propagation delay for communications between the UE and a base station via a satellite, determining, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to one or more of the UE or the base station, and transmitting the uplink communication to the base station via the satellite based on the uplink timing.

A non-transitory computer-readable medium storing code for wireless communication at a UE is described. The code may include instructions executable by a processor to identify, based on round trip delay information received from a network, a propagation delay for communications between the UE and a base station via a satellite, determine, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to one or more of the UE or the base station, and transmit the uplink communication to the base station via the satellite based on the uplink timing.

Some examples of the method, apparatuses, and non-transitory computer-readable medium described herein may further include operations, features, means, or instructions for determining a first portion of the propagation delay and a first propagation delay variation for a UE-to-satellite link, determining a second portion of the propagation delay and a second propagation delay variation for a satellite-to-base station link, and where the propagation delay for communications between the UE and the base station may be based on one or more of the first portion of the propagation delay, the first propagation delay variation, the second portion of the propagation delay, or the second propagation delay variation. Some examples of the method, apparatuses, and non-transitory computer-readable medium described herein may further include operations, features, means, or instructions for receiving configuration information that indicates whether the uplink timing is based on a UE-to-satellite propagation delay or is based on a UE-to-gateway propagation delay. In some examples of the method, apparatuses, and non-transitory computer-readable medium described herein, the configuration information may be provided in a system information broadcast transmission, or in UE-specific signaling.

Some examples of the method, apparatuses, and non-transitory computer-readable medium described herein may further include operations, features, means, or instructions for receiving paging information to update the round trip delay information. In some examples of the method, apparatuses, and non-transitory computer-readable medium described herein, the paging information may be provided in an indication bit in a downlink control information paging indication, in a direct indication in downlink control information, or in a paging indication that is scrambled with a radio network temporary identifier (RNTI) that is associated with a round trip delay information update.

In some examples of the method, apparatuses, and non-transitory computer-readable medium described herein, the configuration information indicates that the uplink timing is based on the UE-to-base station propagation delay, and where the configuration information further provides a round trip delay offset associated with the base station and the satellite, and a round trip delay variation associated with the base station and the satellite. In some examples of the method, apparatuses, and non-transitory computer-readable medium described herein, the configuration information indicates that the uplink timing is based on the UE-to-satellite propagation delay, and where the uplink timing is determined based only on the UE-to-satellite propagation delay. In some examples of the method, apparatuses, and non-transitory computer-readable medium described herein, the configuration information may be received in a master information block (MIB).

Some examples of the method, apparatuses, and non-transitory computer-readable medium described herein may further include operations, features, means, or instructions for identifying a validity time associated with the round trip delay information, and monitoring for updated round trip delay information responsive to an expiration of the validity time. In some examples of the method, apparatuses, and non-transitory computer-readable medium described herein, the validity time may be based on a predefined modification period or based on receiving configuration information that configures a modification period, and where the UE monitors for the updated round trip delay information once per modification period. In some examples of the method, apparatuses, and non-transitory computer-readable medium described herein, the validity time starts when a system information block (SIB) that contains the round trip delay information is acquired, and where the monitoring for the updated round trip delay information includes acquiring another instance of the SIB. In some examples of the method, apparatuses, and non-transitory computer-readable medium described herein, the round trip delay information includes an initial value of the propagation delay for use in an initial access procedure, and where the propagation delay variation is determined subsequent to the initial access procedure based on a duration in which a plurality of propagation delays are determined. In some examples of the method, apparatuses, and non-transitory computer-readable medium described herein, the round trip delay information includes a satellite-to-base station propagation delay, and where the UE determines a UE-to-satellite propagation delay, and where the propagation delay variation is determined based on a duration in which a plurality of propagation delays are determined.

In some examples of the method, apparatuses, and non-transitory computer-readable medium described herein, the round trip delay information further includes a UE-to-satellite propagation delay. In some examples of the method, apparatuses, and non-transitory computer-readable medium described herein, a mid-point of a transmission beam coverage area for a transmission beam used for communications with the UE may be considered as a location of the UE for the UE-to-satellite propagation delay. In some examples of the method, apparatuses, and non-transitory computer-readable medium described herein, the round trip delay information includes a base station-to-UE propagation delay for use in an initial access procedure, and where the propagation delay variation is determined subsequent to the initial access procedure.

In some examples of the method, apparatuses, and non-transitory computer-readable medium described herein, the identifying further may include operations, features, means, or instructions for receiving a broadcast transmission that includes the round trip delay information, and where the broadcast transmission is periodically broadcast at a first periodicity. In some examples of the method, apparatuses, and non-transitory computer-readable medium described herein, the round trip delay information includes the propagation delay and the propagation delay variation. In some examples of the method, apparatuses, and non-transitory computer-readable medium described herein, the propagation delay is transmitted at a first periodicity, and the propagation delay variation is transmitted at a second periodicity that may be different than the first periodicity. In some examples of the method, apparatuses, and non-transitory computer-readable medium described herein, the first periodicity may be a first predefined fixed periodicity or may be configured in signaling transmitted to the UE, and where the second periodicity may be a second predefined fixed periodicity or may be configured in signaling transmitted to the UE. In some examples of the method, apparatuses, and non-transitory computer-readable medium described herein, the propagation delay may be provided in broadcast signaling, and the propagation delay variation may be provided in dedicated signaling to the UE.

Some examples of the method, apparatuses, and non-transitory computer-readable medium described herein may further include operations, features, means, or instructions for determining one or more of the propagation delay or the propagation delay variation based on one or more of information from a global navigation satellite system (GNSS) component at the UE, ephemeris information associated with the satellite, information provided by the base station, or any combinations thereof.

In some examples of the method, apparatuses, and non-transitory computer-readable medium described herein, the round trip delay information includes an indication of the propagation delay and may be provided periodically by the base station, and where the propagation delay variation may be determined based on differences between two or more instances of the propagation delay. In some examples of the method, apparatuses, and non-transitory computer-readable medium described herein, the propagation delay variation may be determined based on a difference between two instances of the propagation delay and a time difference between receipt of the two instances of the propagation delay.

In some examples of the method, apparatuses, and non-transitory computer-readable medium described herein, the identifying may include operations, features, means, or instructions for receiving an indication of a base station location in the round trip delay information, and determining one or more of the propagation delay or the propagation delay variation based on the base station location, a UE location, and a satellite location. In some examples of the method, apparatuses, and non-transitory computer-readable medium described herein, the base station location may be provided in radio resource control signaling when the UE is in a connected mode with the base station. In some examples of the method, apparatuses, and non-transitory computer-readable medium described herein, the base station location may be a virtual geo-location that allows for determination of the propagation delay variation, and is provided in dedicated signaling to the UE or in broadcast signaling. In some examples of the method, apparatuses, and non-transitory computer-readable medium described herein, the uplink timing for initiating the uplink communication to the base station is based on a UE-to-satellite propagation delay and a UE-to-satellite propagation delay variation, irrespective of a satellite-to-base station propagation delay or a satellite-to-base station propagation delay variability.

A method of wireless communication at a base station is described. The method may include identifying round trip delay information associated with a propagation delay for communications with at least a first UE via a satellite, determining configuration information based on the round trip delay information, the configuration information indicating that the first UE is to identify the propagation delay and a propagation delay variation for uplink communications to the base station via the satellite based on a satellite timing reference or a base station timing reference, where the propagation delay variation is based on movement of the satellite relative to one or more of the UE or the base station, and transmitting the configuration information to at least the first UE.

An apparatus for wireless communication at a base station is described. The apparatus may include a processor, memory coupled with the processor, and instructions stored in the memory. The instructions may be executable by the processor to cause the apparatus to identify round trip delay information associated with a propagation delay for communications with at least a first UE via a satellite, determine configuration information based on the round trip delay information, the configuration information indicating that the first UE is to identify the propagation delay and a propagation delay variation for uplink communications to the base station via the satellite based on a satellite timing reference or a base station timing reference, where the propagation delay variation is based on movement of the satellite relative to one or more of the UE or the base station, and transmit the configuration information to at least the first UE.

Another apparatus for wireless communication at a base station is described. The apparatus may include means for identifying round trip delay information associated with a propagation delay for communications with at least a first UE via a satellite, determining configuration information based on the round trip delay information, the configuration information indicating that the first UE is to identify the propagation delay and a propagation delay variation for uplink communications to the base station via the satellite based on a satellite timing reference or a base station timing reference, where the propagation delay variation is based on movement of the satellite relative to one or more of the UE or the base station, and transmitting the configuration information to at least the first UE.

A non-transitory computer-readable medium storing code for wireless communication at a base station is described. The code may include instructions executable by a processor to identify round trip delay information associated with a propagation delay for communications with at least a first UE via a satellite based on a satellite timing reference or a base station timing reference, determine configuration information based on the round trip delay information, the configuration information indicating that the first UE is to identify the propagation delay and a propagation delay variation for uplink communications to the base station via the satellite, where the propagation delay variation is based on movement of the satellite relative to one or more of the UE or the base station, and transmit the configuration information to at least the first UE.

In some examples of the method, apparatuses, and non-transitory computer-readable medium described herein, the configuration information includes a variable that indicates whether the uplink timing is based on the satellite timing reference and a UE-to-satellite propagation delay, or is based on the base station timing reference and a UE-to-base station propagation delay based at least in part on a value of the variable. In some examples of the method, apparatuses, and non-transitory computer-readable medium described herein, the configuration information may be transmitted in a system information broadcast transmission from the base station, or in UE-specific signaling to the first UE.

Some examples of the method, apparatuses, and non-transitory computer-readable medium described herein may further include operations, features, means, or instructions for transmitting a paging message to at least the first UE that indicates the first UE is to update the round trip delay information. In some examples of the method, apparatuses, and non-transitory computer-readable medium described herein, the paging message to update the round trip delay information may be provided in an indication bit in a downlink control information paging indication, in a direct indication in downlink control information, or in a paging indication that is scrambled with a radio network temporary identifier (RNTI) that is associated with a round trip delay information update.

In some examples of the method, apparatuses, and non-transitory computer-readable medium described herein, the configuration information indicates that the uplink timing may be based on a UE-to-base station propagation delay, and where the configuration information further provides a round trip delay offset associated with the base station and the satellite, and a round trip delay variation associated with the base station and the satellite. In some examples of the method, apparatuses, and non-transitory computer-readable medium described herein, the configuration information indicates that the uplink timing may be based on the UE-to-satellite propagation delay, and where the uplink timing may be determined based only on the UE-to-satellite propagation delay. In some examples of the method, apparatuses, and non-transitory computer-readable medium described herein, the configuration information may be transmitted in a master information block (MIB).

Some examples of the method, apparatuses, and non-transitory computer-readable medium described herein may further include operations, features, means, or instructions for periodically transmitting instances of the configuration information with updated round trip delay information. In some examples of the method, apparatuses, and non-transitory computer-readable medium described herein, a periodicity for transmitting the instances of the configuration information with the updated round trip delay information may be based on a predefined modification period or a configured modification period indicated in the configuration information. In some examples of the method, apparatuses, and non-transitory computer-readable medium described herein, the round trip delay information includes an initial value of the propagation delay for use in an initial access procedure, and where the propagation delay variation may be determined subsequent to the initial access procedure.

DETAILED DESCRIPTION

Figure 1:
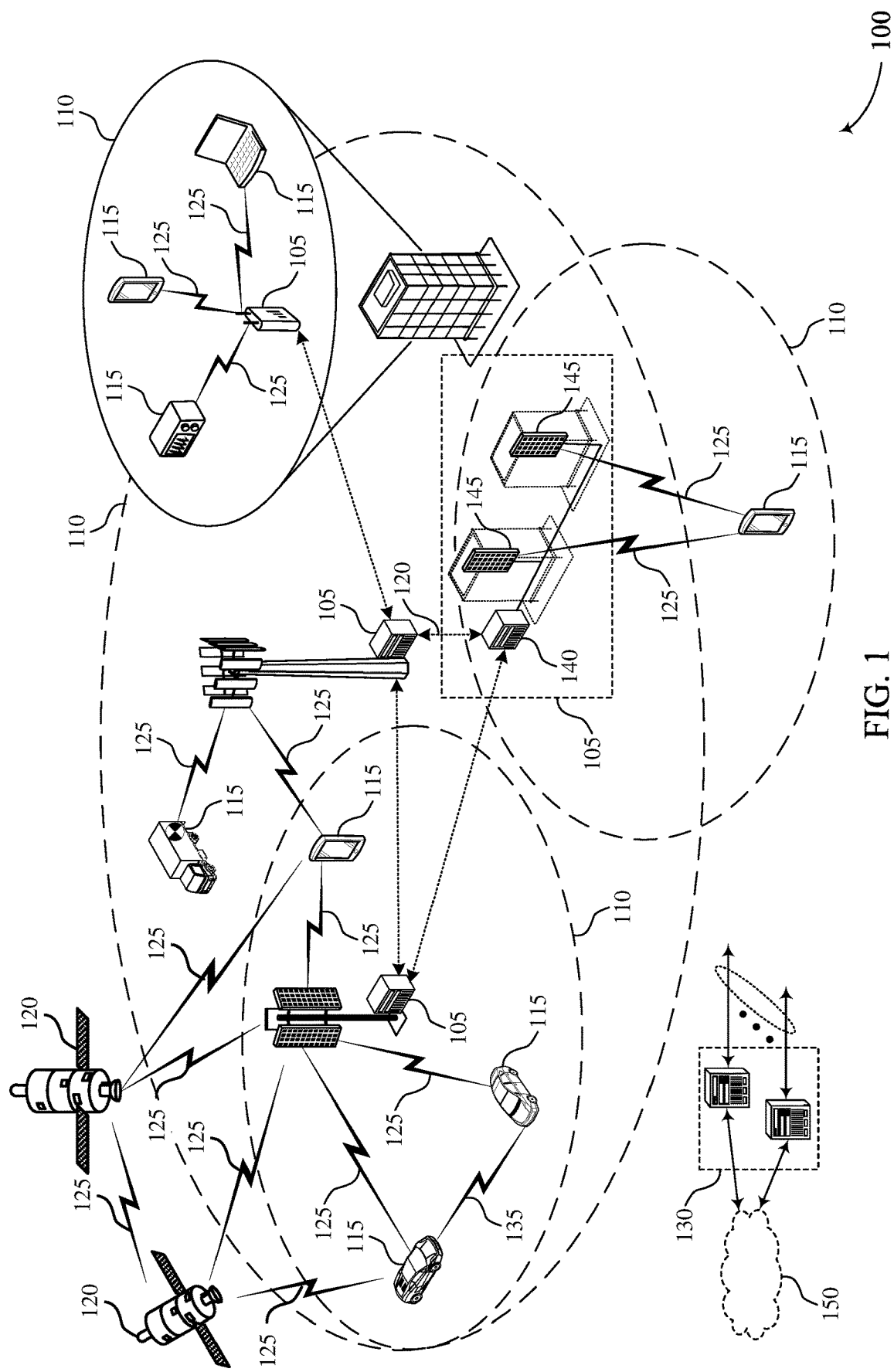
FIG. 1 illustrates an example of a system for wireless communications that supports timing adjustment in non-terrestrial wireless communications in accordance with aspects of the present disclosure.

Non-terrestrial networks (sometimes referred to as NTNs) may provide coverage by using high-altitude vehicles between user terminals and gateways or base stations (e.g., next-generation NodeBs or giga-NodeBs (which may be referred to as a gNB, and also referred to as access stations or access gateways)). A gateway may, for example, transmit data to a satellite which may then be relayed to a user terminal or vice-versa. A high-altitude vehicle may be a base station in some examples. A user terminal may be any device capable of transmitting signals to a satellite. Examples of a user terminal may include a user equipment (UE), a relay equipment configured to relay a signal between a satellite and a user terminal, or a combination thereof. NTNs may involve the use of high altitude platform stations (HAPSs) and/or satellites to provide coverage for terrestrial base stations and UEs. The terms HAPS and satellite are used interchangeably herein to refer to a remote NTN device that may provide coverage to one or more other high altitude or terrestrial devices. Likewise, the terms gateway and base station are used interchangeably herein to refer to a network node that serves a UE and provides network access to the UE.

The gateway and the satellite may be thousands of kilometers apart and it may take some time for electromagnetic waves to propagate over the distance between the gateway and the satellite and between the satellite and the user terminal. Thus, the propagation delay for non-terrestrial networks may be many orders of magnitude larger than the propagation delay for terrestrial networks. As such, the round trip delay (sometimes referred to as an RTD) associated with a signal may also be orders of magnitude larger for non-terrestrial networks than for terrestrial networks. Further, due to the high mobility of high-altitude vehicles such as non-geostationary satellites, communications with the non-geostationary satellites may promote large and time-varying round trip delays. Variations in round trip delay may cause user terminals to experience variation in uplink timing and frequency synchronization with satellites. As demand for communication efficiency increases, it may be desirable for wireless communications systems to support techniques for estimating and determining uplink timing that account for round trip delay as well as variation in round trip delay.

As described herein, UEs, base stations or gateways, and satellites may support estimating propagation delay and propagation delay variation for use in determining timing for uplink transmissions from a UE to a gateway via a satellite. In some cases, a UE may determine uplink timing such that an uplink transmission from the UE to the gateway arrives at the gateway in a time-synchronized manner. The UE may apply a timing advance to determine the uplink timing based on the estimated propagation delay and propagation delay variation between the UE and the satellite, between the satellite and the gateway, or any combinations thereof. In some cases, propagation delay and propagation delay variation may be determined based on a gateway timing reference (e.g., a base station timing reference), or based on a satellite timing reference. In some cases, a serving gateway may configure the UE to use one of the gateway or satellite timing references. In some cases, the serving gateway may provide information related to round trip delay, variation in round trip delay, or both, to assist the UE in determining uplink timing.

Particular aspects of the subject matter described herein may be implemented to realize one or more of the following potential advantages. The described techniques may support improvements in estimating timing offsets relating to communications between high-altitude vehicles (e.g., satellites or other non-terrestrial-based equipment), user terminals, and gateways or base stations, in non-terrestrial networks, among other advantages. As such, supported techniques may include features for efficient non-terrestrial communications. The described techniques may also support increased spectral efficiency and, in some examples, may promote higher mobility support for user terminals in non-terrestrial networks compared to terrestrial networks, among other benefits.

Aspects of the disclosure are initially described in the context of wireless communications systems. Aspects of the disclosure are also illustrated by timing diagrams and process flow diagrams. Aspects of the disclosure are further illustrated by and described with reference to apparatus diagrams, system diagrams, and flowcharts that relate to timing adjustment in non-terrestrial wireless communications.

FIG. 1 illustrates an example of a wireless communications system 100 that supports timing adjustment in non-terrestrial wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 (also referred to as gateways in NTNs) and UEs 115 (or other high altitude or terrestrial communications devices). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, may be configured to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa.

UEs 115 may communicate with satellites 120 and/or base stations or gateways 105 using communications links 125. In some cases, timing adjustments to account for propagation delay communications links 125 via a satellite 120 may include a propagation delay between a UE 115 and a satellite 120, or a propagation delay between a base station 105 and a satellite 120, or both, as well as a variation in the propagation delays due to movement of the satellite. In accordance with various techniques discussed herein, a UE 115 may account for variation in propagation delay, in addition to determined propagation delay, when determining an uplink timing for uplink communications via a satellite 120.

Figure 2:
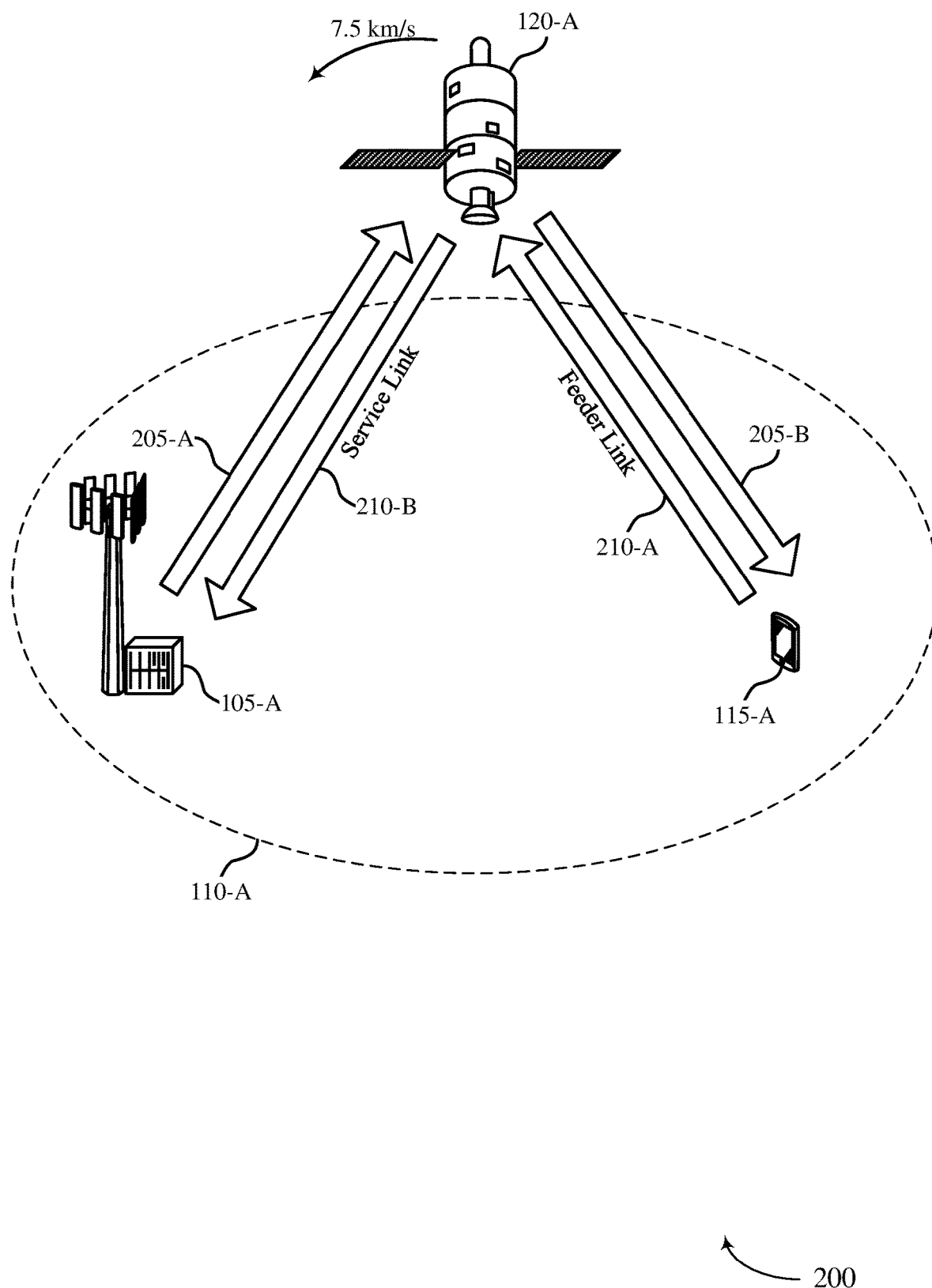
FIG. 2 illustrates an example of a wireless communications system that supports timing adjustment in non-terrestrial wireless communications in accordance with aspects of the present disclosure.

FIG. 2 illustrates an example of a wireless communications system 200 that supports timing adjustment in non-terrestrial wireless communications in accordance with aspects of the present disclosure. In some examples, wireless communications system 200 may implement aspects of wireless communications system 100. Wireless communications system 200 may include a gateway 105-a, a UE 115-a, and a satellite 120-a, which may be examples of a base station 105, UEs 115, and satellites 120 as described with reference to FIG. 1. The gateway 105-a may serve a coverage area 110-a in examples of a terrestrial network, and the satellite 120-a may serve coverage area 110-a in examples of an NTN.

In some examples, the satellite 120-a may relay communications between the gateway 105-a and the UE 115-a. For example, the gateway 105-a may communicate with the UE 115-a via the satellite 120-a or vice-versa. In some examples, for communications originating at the gateway 105-a and going to the UE 115-a, the gateway 105-a may transmit an uplink transmission 205-a to the satellite 120-a, which may be referred to as a service link. The satellite 120-a may relay the uplink transmission 205-a as a downlink transmission 205-b to the UE 115-a, which may be referred to as a feeder link. In other examples, for communications originating at the UE 115-a and going to the gateway 105-a, the UE 115-a may transmit an uplink transmission 210-a to the satellite 120-a via feeder link. The satellite 120-a may relay the uplink transmission 210-a as a downlink transmission 210-b to gateway 105-b via the service link.

The gateway 105-a and the satellite 120-a may be thousands of kilometers apart and it may take some time for electromagnetic waves to propagate over the distance between the gateway 105-a and the satellite 120-a and between the satellite 120-a and the UE 115-a. The propagation delay for non-terrestrial networks may be many orders of magnitude larger than the propagation delay for terrestrial networks. As such, the round trip delay associated with a transmission may also be orders of magnitude larger for non-terrestrial networks than for terrestrial networks. In addition, high speeds of non-geostationary satellites, for example, such as the satellite 120-a may promote variation in round trip delay. As a result, the UE 115-a may experience variation in uplink timing synchronization with the satellite 120-a. Likewise, the gateway 105-a may experience variation in uplink and downlink timing synchronization with the satellite 120-a. Thus, a total propagation delay may be comprised of a first portion of the propagation delay and a first propagation delay variation for the UE-to-satellite link, and a second portion of the propagation delay and a second propagation delay variation for the satellite-to-gateway link. In some cases, round trip delay information may include a satellite-to-gateway propagation delay, where the UE determines a UE-to-satellite propagation delay, and where the propagation delay variation is determined based on a duration in which a plurality of propagation delays are determined.

By way of example, the satellite 120-a may be in an orbit, such as low earth orbit, medium earth orbit, or non-geostationary earth orbit. In any of these examples, the satellite 120-a may be many thousands of kilometers from earth, and therefore may be thousands of kilometers from the gateway 105-a and the UE 115-a. Each transmission 205 or 210 between the gateway 105-a and the UE 115-a may therefore travel from earth the distance to the satellite 120-a and back to earth. The distance that a transmission travels may increase the propagation delay of a transmission or round trip delay associated with the transmission. The propagation delay may refer to a duration it takes for a signal to travel from a source to an intended recipient. The round trip delay may refer to a duration it takes for a transmission to be transmitted from the source to the intended recipient, processed by the intended recipient, and a response transmitted from the intended recipient of the transmission back to the source.

The UE 115-a may support a closed-loop timing control to maintain an uplink timing synchronization (or uplink timing accuracy) with the satellite 120-a, or with the gateway 105-a. The UE 115-a, in some examples, may rely on network signaled round trip delay information or a round trip delay variation rate (e.g., of a beam center of the satellite 120-a) when the UE 115-a is unable to determine its geolocation within the geographic coverage area 110-a. When the satellite 120-a is in a low-earth orbit, the satellite 120-a may be between 600 km to 2000 km from earth and travelling at a rate of 7.5 km/s. In the example of a low earth orbit location of the satellite 120-a, for example, such as a 1200 km orbit from earth with an elevation angle of 30° the round trip delay variation rate may be on the order of 35 microseconds (μs) per second (s) (μs/s).

Figure 3:
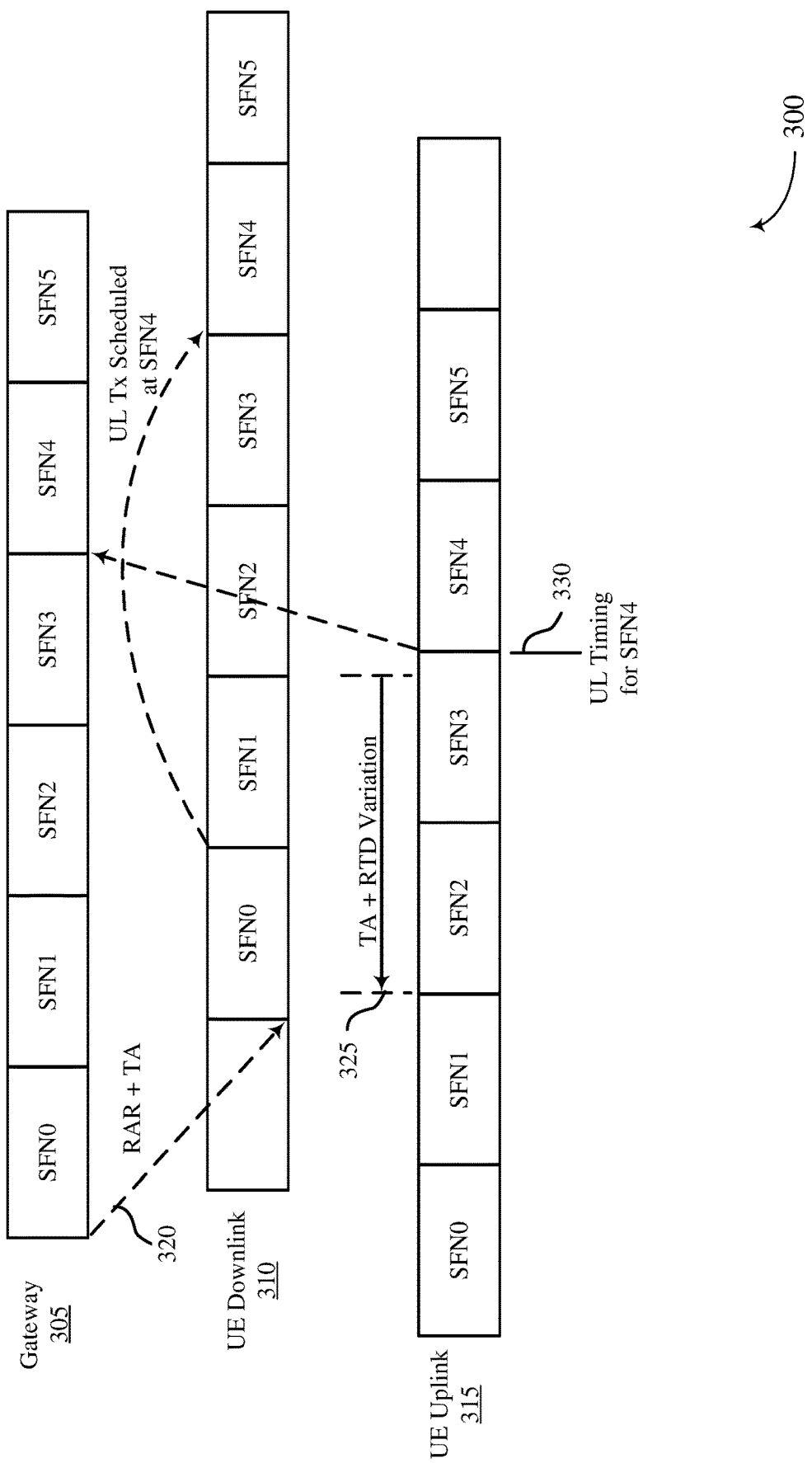
FIG. 3 illustrates an example of a frame timing that supports timing adjustment in non-terrestrial wireless communications in accordance with aspects of the present disclosure.

In order to provide synchronized uplink and downlink timing at the gateway 105-a, communications to and from the gateway 105-a may be made according to a gateway 105-a timing reference. The UE 115-a may adjust a timing of uplink communications to the gateway 105-a such that the uplink communication is transmitted far enough in advance of a timing boundary or frame boundary at the gateway 105-a to have a time of arrival at the gateway 105-a that corresponds to the timing boundary or frame boundary. In other cases, the UE 115-a may use a satellite 120-a timing reference for uplink communications, such that uplink communications are received at the satellite 120-a at a desired time or frame boundary. In either case, the satellite 120-a may have a sufficient propagation delay variation that the UE 115-a uplink timing may be based on the propagation delay and the propagation delay variation. FIG. 3 illustrates an example of a gateway timing reference in accordance with various aspects of the disclosure, with the understanding that such relative timing references may be applied in cases where the satellite timing reference is used for determination of uplink transmission timing.

FIG. 3 illustrates an example of a frame timing 300 that supports timing adjustment in non-terrestrial wireless communications in accordance with aspects of the present disclosure. In some examples, frame timing 300 may implement aspects of wireless communications system 100 or 200. For example, the frame timing 300 may be based on a configuration by a gateway 105, and implemented by a UE 115 for estimating and determining uplink timing in a non-terrestrial network, as described with reference to FIGS. 1 and 2.

In this example, a gateway timing 305 may have a number of frame boundaries that correspond to system frame numbers (SFNs). A UE downlink timing 310 may lag the gateway timing 305 by an amount of propagation delay between the UE and the gateway, which may include a UE-to-satellite propagation delay and a satellite-to-gateway propagation delay. In order to provide uplink communications that are received at the gateway and synchronized with SFN boundaries, UE uplink timing 315 may have each corresponding SFN advanced ahead of the UE downlink timing 310 by an amount of the round trip delay 325, which may take into account propagation delay variation due to the velocity of the satellite relative to the UE and base station. In this example, for initial access, the UE may transmit a random access request to the gateway, via the satellite, to initiate a connection establishment. In some cases, an initial round trip delay value for random access requests may be broadcast by the gateway, and may be sufficient for the gateway to receive and decode the random access request even in the presence of some timing error. The gateway may transmit a random access response (RAR) and timing advance (TA) value 320 to the UE in response to the random access request. In some cases, the gateway may also provide information related to propagation delay variation. In the example of FIG. 3, the gateway may schedule the UE to transmit an uplink transmission in SFN4. Based on the timing advance and propagation delay variation, the UE may determine an uplink timing 330 for SFN4 such that the uplink transmission from the UE, via the satellite, arrives at the gateway aligned with a frame boundary of SFN4.

In cases where the gateway timing reference is used for determination of uplink timing 330, the total one-way propagation delay corresponds to the delay between the UE and satellite ($D_{UE}$) plus the delay between the satellite and gateway ($D_{sat}$). The UE may be able to estimate $D_{UE}$, for example in cases where the UE has a global navigation satellite system (GNSS) capability, but may not know the $D_{sat}$ due to speed of satellite or handover of the feeder link. In accordance with various aspects of the present disclosure, techniques for determining $D_{sat}$ as well as a variation in $D_{sat}$ are described, for cases in which reference timing is set at the gateway. In cases where satellite reference timing is used, the service link may be aligned according to a satellite clock, and the gateway may adjust its transmit timing to compensate for delay between satellite and gateway, and thus the UE does not need to consider timing variation of the feeder link due to satellite movement relative to gateway.

In cases where the UE uses the gateway timing reference, when the UE receives uplink scheduling (e.g., in downlink control information of a downlink message from the gateway), the UE may determine the uplink timing according to the received downlink signal timing plus a timing advance, plus a signaled offset, plus a calculated timing variation based on propagation delay variation. As the reference timing is set at the gateway (e.g., a ground-based gateway), both the feeder link (gateway-satellite) and service link (satellite-UE) round trip delays may be considered. In some cases, the gateway or other network node may broadcast information about RTD (e.g., to be used in initial access such as a random access procedure). In such cases, the gateway may broadcast the RTD between the gateway and satellite. Additionally, the gateway may broadcast the RTD between the satellite and the UE (considering beam center as the reception point). Alternatively, the gateway may broadcast the RTD between the gateway and the UE (e.g., taking into consideration both the gateway-satellite and satellite-UE links considering beam center as the reception point). In some cases, the broadcast of RTD information may be done periodically (e.g., with period P1, which may be a fixed specified value, or may be configurable and signaled to the UEs).

As the RTD can be variable due to movement of satellite and/or UE, the gateway may broadcast information about RTD variation to be used for the subsequent uplink transmissions. In some cases, the gateway may broadcast the RTD variation between the gateway and satellite. Additionally, the gateway may, in some cases, broadcast the RTD variation between the satellite and the UE (e.g., considering beam center as the reception point). The broadcast of RTD variation, in some cases, may be done periodically (e.g., with period P2 that may be different than P1, where P2 may be a fixed specified value, or may be configurable and signaled to the UE). In some cases, the RTD variation may be signaled with different periodicity than RTD (e.g., more frequently than RTD itself). Alternatively, the RTD variation may be provided in a UE-specific manner via dedicated signaling (e.g., in radio resource control (RRC) signaling, or in a MAC-CE when the UE is in connected mode. While various examples described herein provide the gateway may transmit information related to RTD, in other cases RTD information, configuration information, or combinations thereof, may be provided by one or more other network nodes in the wireless communications system, such as a different base station or access point that may provide configuration information, RTD information, RTD variation information, or combinations thereof.

In some cases, the UE may determine the RTD between the UE and the satellite, based on one or more of a GNSS capability of the UE, ephemeris information associated with the satellite, information provided by gateway (e.g., in broadcast or unicast), or any combinations thereof. In some cases, the gateway may not provide an explicit indication of RTD variation, and the UE may use the RTD information provided periodically to estimate the RTD variation. For example, the UE may acquire the RTD at time t−1 and at time t, and may estimate the RTD variation as $(RTD_t - RTD_{t-1})/P1$. In other cases, RTD variation may not be provided by the gateway, and the UE may determine the RTD variation based on a location of the gateway. In such cases, the UE may calculate the RTD and RTD variation between UE and gateway. The location of the gateway may be, in some cases, provided to UE securely via dedicated RRC signaling when the UE is in connected mode (e.g., during the registration process). In such cases, a UE with GNSS capability may estimate the RTD and RTD variation between satellite and gateway. Further, in such cases, system broadcast values of RTD may be used for initial RRC connection. In other cases, a gateway geo-location or any other virtual geo-location may be used to determine RTD and RTD variation, with the virtual geo-location selected such that the variation rate is the same as the true geo-location/Such virtual geo-location information may be broadcast or be provided by dedicated signaling to a UE. The UE may calculate the RTD variation using this virtual geo-location location. In such cases, the RTD value with true gateway can be broadcast.

In cases where the satellite timing reference is used for UE uplink timing, the UE may calculate the RTD and timing variation for RTD only between UE and satellite. In such cases, the UE does not consider the RTD variation between satellite and gateway. In some cases, the RTD between satellite and gateway may be broadcast for initial access.

As discussed herein, in some cases the network (e.g., via a gateway that is in communication with UEs via a satellite, or via another network node) may provide configuration information to one or more UEs that may configure the UEs in a NTN and provide an indication whether to use gateway RTD and RTD variation with a gateway timing reference for uplink timing, or whether to use satellite RTD and RTD variation with a satellite timing reference for uplink timing. For example, the configuration information may include a variable, e.g., X, which may be broadcast, where a value of X>0 may indicate to use gateway RTD and RTD variation and a value of X=0 may indicate not to use gateway RTD for initial access or timing advance. In some cases, the configuration information may be provided in a system information broadcast (e.g., in a system information block (SIB) such as a SIB1 broadcast or in a NTN-specific SIB). In other cases, the configuration may be prespecified, and the network may not need to provide any signaling to indicate whether to use gateway or satellite RTD and RTD variation. In further cases, the configuration may be provided to the UE in UE-specific signaling (e.g., in RRC signaling, in a MAC-CE, etc.). In such cases, the UE, when in IDLE mode, may need to be paged to change the indication. In some cases, for initial access, a zero RTD variation can be used. An example of broadcast signaling indicating the uplink timing reference in a SIB is indicated starting with the upTimeReference-r16 parameter below:

```
ServingCellConfigCommonSIB::= SEQUENCE {
    downlinkConfigCommon       DownlinkConfigCommonSIB,
    uplinkConfigCommon         UplinkConfigCommonSIB        OPTIONAL, -- Need R
    supplementaryUplink        UplinkConfigCommonSIB        OPTIONAL, -- Need R
    n-TimingAdvanceOffset         ENUMERATED { n0, n25600, n39936 }
    OPTIONAL, -- Need S
    <skipped>
    ..,
    ulTimeReference-r16           ENUMERATED {useGatewayTime,
    useSatelliteTime}          OPTIONAL, -- Need R
        rtd-Offset-r16                ENUMERATED {n1, n2, n3, spare)
        OPTIONAL, -- Need S
        rtd-variation-r16             ENUMERATED {n1, n2, n3, spare)         OPTIONAL
    -- Need S
]]
}
```

In some cases, if the "ulTimeReference" is set to "useGatewayTime," then the UE uses compensation due to RTD and RTD variation between satellite and gateway using the value provided by rtd-Offset-r16 and rtd-variation-r16. Otherwise (if "ulTimeReference" is set to "useSatelliteTime"), the UE applies the compensation in RTD variation only between UE and satellite (e.g., either calculated by UE or a broadcast value). In some cases, if "ulTimeReference" is not present, then "rtd-Offset-r16" and "rtd-variation-r16" are not provided. This indication for "ulTimeReference" can be indicated, in some cases, in a MIB or in a NTN-specific MIB for NTN that is defined to accommodate the parameters.

As discussed, in some cases the network may provide periodic updates to the RTD and RTD variation. In some cases, the RTD and RTD variation broadcast in the system information may be updated by the gateway (or other network node) periodically. However, this change in the system information may not trigger a system information update procedure at the UE. In some cases, in order to trigger a system information update at the UE, one or more validity timer(s) may be established that are associated with RTD, RTD variation, or both. In some cases, a same or different value of a remaining validity time or lifetime for the RTD and RTD variation may be indicated in the broadcast information. The gateway in such cases may keep updating remaining time without knowledge of the UE. After the expiry, UE re-acquires the system information with updated propagation delay information. An example of broadcast information that provides a remaining validity for propagation delay information is:

| | |
|---|---|
| ulTimeReference-r16 useSatelliteTime} | ENUMERATED {useGatewayTime, OPTIONAL, -- Need R |
| rtd-Offset-r16 OPTIONAL, -- Need S | ENUMERATED {n1, n2, n3, spare} |
| rtd-variation-r16 OPTIONAL, -- Need S | ENUMERATED {n1, n2, n3, spare} |
| RemainingValidity-r16 t2, t3, spare} | ENUMERATED {t1 OPTIONAL -- Need S |

In other cases, a same or different modification periodicity (p) may be defined (e.g., hard coded or provided in SIB) for the update of RTD and RTD variation. The start of the modification period in such cases may be at the SFN mod p.=0. Thus, every p. SFNs, the UE may update the parameters (i.e., once per modification period). In other cases, when the UE acquires the parameter in a broadcast transmission (e.g., in a SIB), the UE may starts a validity timer. Upon expiry of the validity timer, the UE may again acquire the broadcast transmission to update the parameters. In other cases, a paging procedure may be used to indicate that the RTD and RTD variation has been updated. For example, a new updated indication bit may be provided in downlink control information (DCI) for paging, a direct indication may be provided in DCI or a new paging RNTI may be defined such that a UE that receives a page scrambled by the new paging RNTI will update the RTD and RTD variation parameters. In some cases, separate update indications, validity timers, paging techniques, or combinations thereof may be used for RTD and for RTD variation, such that RTD may be updated independently of RTD variation (e.g., according to different periodicities).

Figure 4:
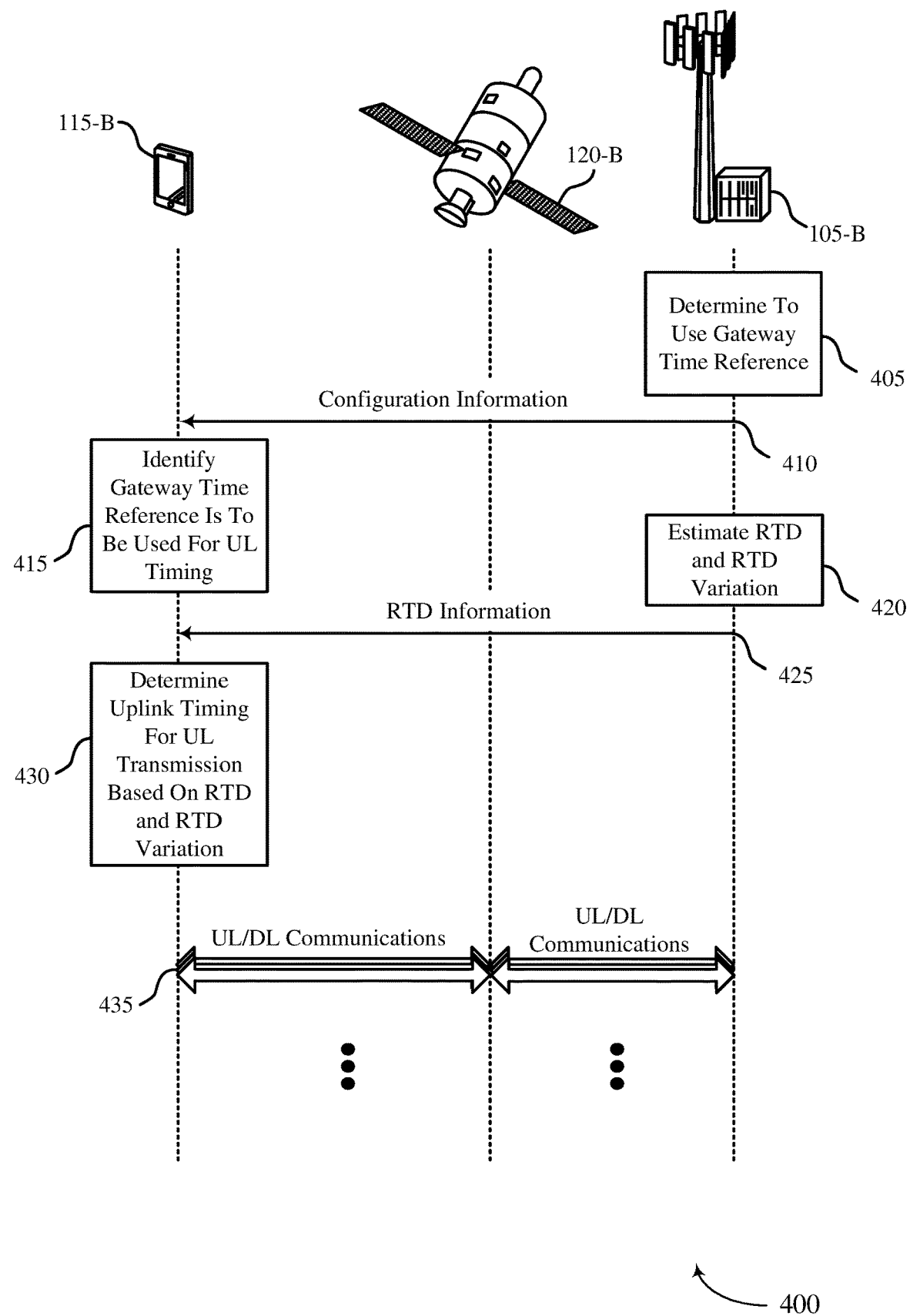
FIG. 4 illustrates an example of a process flow that supports timing adjustment in non-terrestrial wireless communications in accordance with aspects of the present disclosure.

FIG. 4 illustrates an example of a process flow 400 that supports timing adjustment in non-terrestrial wireless communications in accordance with aspects of the present disclosure. The process flow 400 may implement aspects of the wireless communications systems 100 and 200, as described with reference to FIGS. 1 and 2. For example, the process flow 400 may be based on a configuration by a network, and implemented by a UE for identifying propagation delay and propagation delay variation for use in determining uplink timing in a non-terrestrial network, as described with reference to FIGS. 1 and 2.

The process flow 400 may include a gateway 105-b, a UE 115-b, and a satellite 120-b, which may be examples of a gateway 105, a UE 115, and a satellite 120 as described with reference to FIGS. 1 and 2. In the following description of the process flow 400, the operations between the gateway 105-b, the UE 115-b, and the satellite 120-b may be performed in a different order than the example order shown, or the operations performed by the gateway 105-b, the UE 115-b, and the satellite 120-b may be performed in different orders or at different times. Some operations may also be omitted from the process flow 400, and other operations may be added to the process flow 400. In the example of FIG. 4, the gateway 105-b, the UE 115-b, and the satellite 120-b may be in communication with each other via a non-terrestrial network. The process flow 400 may support higher data rates, improved mobility support for the UE 115-b in the non-terrestrial network, among other benefits.

At 405, the gateway 105-b may determine to use the gateway timing reference for communications with the UE 115-b. At 410, the gateway 105-b may transmit configuration information to the UE 115-b that indicates that the gateway timing reference is to be used for uplink communications timing of the UE 115-b. In some cases, the configuration information may be provided in broadcast transmissions from the gateway 105-b, such as in broadcast transmissions as discussed herein.

At 415, the UE 115-b may identify the gateway timing reference is to be used for uplink timing determination. In some cases, the UE 115-b may decode broadcast information that indicates to use the gateway timing reference, and that also indicates a propagation delay value and propagation delay variation. At 420, the gateway 105-b may estimate RTD and RTD variation between the UE 115-b and the gateway 105-b. In some cases, the RTD and RTD variation may be based on propagation delay values and propagation delay variation between the gateway 105-b and satellite 120-b, and based on propagation delay values and propagation delay variation between the satellite 120-b and the UE 115-b (e.g., based on a beam center considered as the reception point). In some cases, the gateway 105-b may use location information of the gateway 105-b (e.g., a provided location, location determined based on a GNSS, or virtual geo-location), UE 115-b (e.g., based on a beam center reception point or based on location information that is associated with the UE 115-b), and the satellite 120-b (e.g., based on GNSS, ephemeris information of the satellite 120-b, or combinations thereof), to determine the propagation delay and propagation delay variation parameters that are then provided to the UE 115-b. At 425, the gateway 105-b may transmit the RTD information to the UE 115-b. In some cases, the RTD information may include information related to a validity time that indicates when the UE 115-b is to monitor for new broadcast information to update the RTD information, as discussed herein.

At 430, the UE 115-b may determine an uplink timing for an uplink transmission based on the RTD and RTD variation. In some cases, the uplink timing may provide that an associated uplink transmission is received at the gateway 105-b that is synchronized with a frame boundary or otherwise synchronized with configured uplink resources allocated to the UE 115-b for the associated uplink transmission. At 435, the UE 115-b and the gateway 105-b may perform uplink and downlink communications via the satellite 120-b. The uplink timing for the uplink communications, as discussed herein, may be determined based on the indicated RTD and RTD variation. In some cases, the gateway 105-b and UE 115-b may periodically update the RTD and RTD variation such that the uplink timing may be determined based on current estimates of the RTD and RTD variation.

Figure 5:
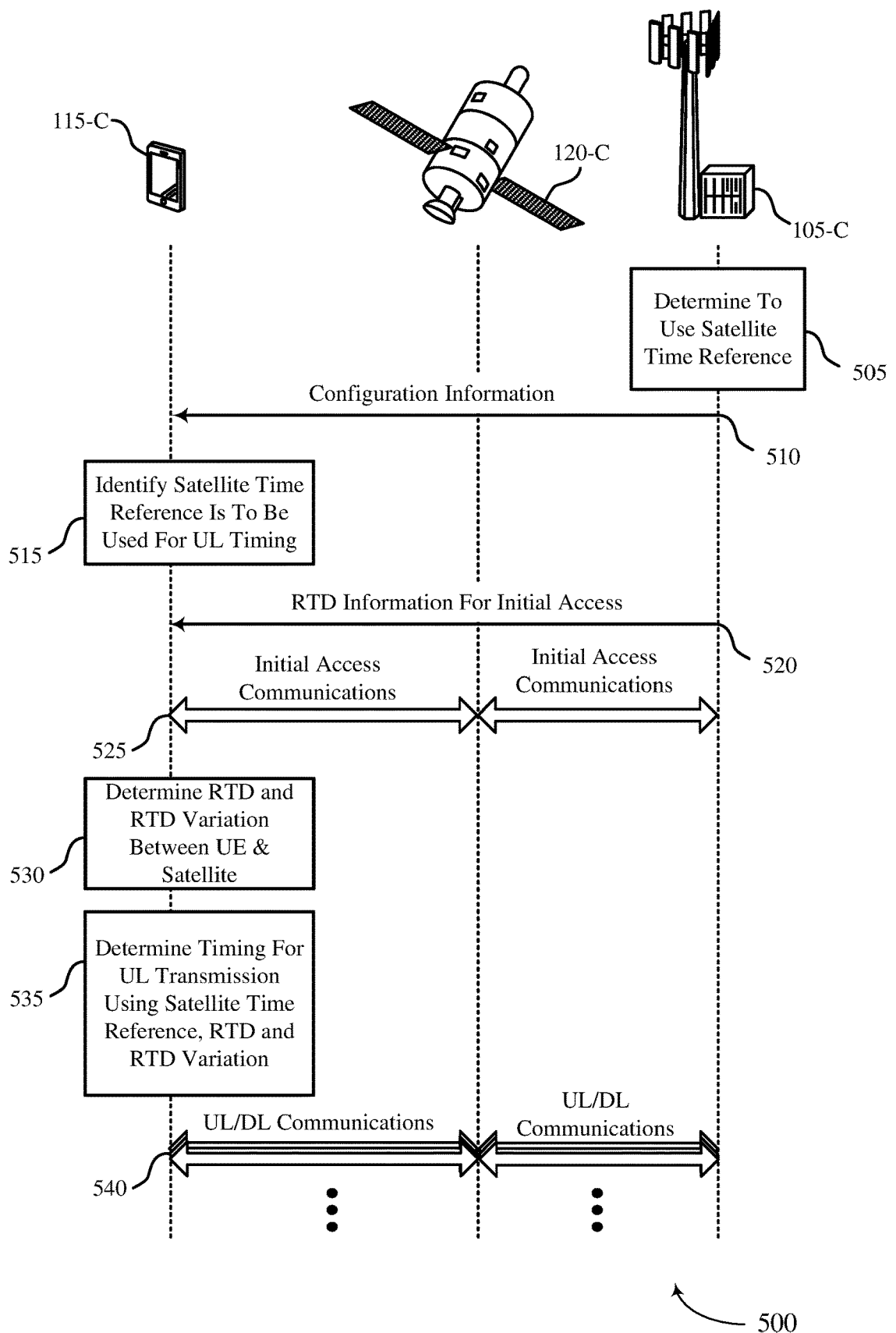
FIG. 5 illustrates an example of a process flow that supports timing adjustment in non-terrestrial wireless communications in accordance with aspects of the present disclosure.

FIG. 5 illustrates an example of a process flow 500 that supports timing adjustment in non-terrestrial wireless communications in accordance with aspects of the present disclosure. The process flow 500 may implement aspects of the wireless communications systems 100 and 200, as described with reference to FIGS. 1 and 2. For example, the process flow 500 may be based on a configuration by a gateway 105-c, and implemented by a UE 115-c for identifying propagation delay and propagation delay variation for use in determining uplink timing in a non-terrestrial network, as described with reference to FIGS. 1 and 2.

The process flow 500 may include a gateway 105-c, a UE 115-c, and a satellite 120-c, which may be examples of a gateway 105, a UE 115, and a satellite 120 as described with reference to FIGS. 1 and 2. In the following description of the process flow 500, the operations between the gateway 105-c, the UE 115-c, and the satellite 120-c may be performed in a different order than the example order shown, or the operations performed by the gateway 105-c, the UE 115-c, and the satellite 120-c may be performed in different orders or at different times. Some operations may also be omitted from the process flow 500, and other operations may be added to the process flow 500. In the example of FIG. 5, the gateway 105-c, the UE 115-c, and the satellite 120-c may be in communication with each other via a non-terrestrial network. The process flow 500 may support higher data rates, improved mobility support for the UE 115-c in the non-terrestrial network, among other benefits.

At 505, the gateway 105-c may determine to use the satellite timing reference for communications with the UE 115-c. At 510, the gateway 105-c may transmit configuration information to the UE 115-c that indicates that the satellite timing reference is to be used for uplink communications timing of the UE 115-c. In some cases, the configuration information may be provided in broadcast transmissions from the gateway 105-c, such as in broadcast transmissions as discussed herein.

At 515, the UE 115-c may identify the satellite timing reference is to be used for uplink timing determination. In some cases, the UE 115-c may decode broadcast information that indicates to use the satellite timing reference, and that may also indicate a propagation delay value alone or in conjunction with a propagation delay variation (e.g., based on a center of a receive beam of the satellite 120-c.

At 520, the gateway 105-c may transmit an RTD value for use in initial access. In some cases, the RTD value for initial access may be provided for the UE 115-c to determine an uplink timing for a random access request message. In some cases, the initial access communications may use an RTD variation of zero. At 525, the UE 115-c and gateway 105-c may transmit initial access communications via satellite 120-c.

At 530, the UE 115-c may determine an RTD and RTD variation between the UE 115-c and the satellite 120-c. In some cases, the RTD and RTD variation may be determined based on location information provided related to the satellite 120-c and location information associated with the UE 115-c. In some cases, a GNSS component at the UE 115-c may be used to determine the UE 115-c location, and ephemeris information from the satellite 120-c may be used to determine the satellite 120-c location and orbital information related to movement of the satellite 120-c relative to the UE 115-c. In some cases, the RTD and RTD variation information may be identified in broadcast or dedicated signaling from the gateway 105-c (e.g., based on a location of a beam center of the satellite 120-c of a beam used for communications with the UE 115-c. In some cases, the signaling that provides the RTD and RTD variation may provide timing information related to a validity time of the RTD and RTD variation information.

At 535, the UE 115-c may determine an uplink timing for an uplink transmission based on the RTD and RTD variation, where the uplink timing uses the satellite timing reference. In some cases, the uplink timing may provide that an associated uplink transmission is received at the satellite 120-c that is synchronized with a frame boundary or otherwise synchronized with configured uplink resources allocated to the UE 115-c for the associated uplink transmission. At 540, the UE 115-c and the gateway 105-c may perform uplink and downlink communications via the satellite 120-c.

The uplink timing for the uplink communications, as discussed herein, may be determined based on the determined or indicated RTD and RTD variation. In some cases, the gateway 105-c and UE 115-c may periodically update the RTD and RTD variation such that the uplink timing may be determined based on current estimates of the RTD and RTD variation.

Figure 6:
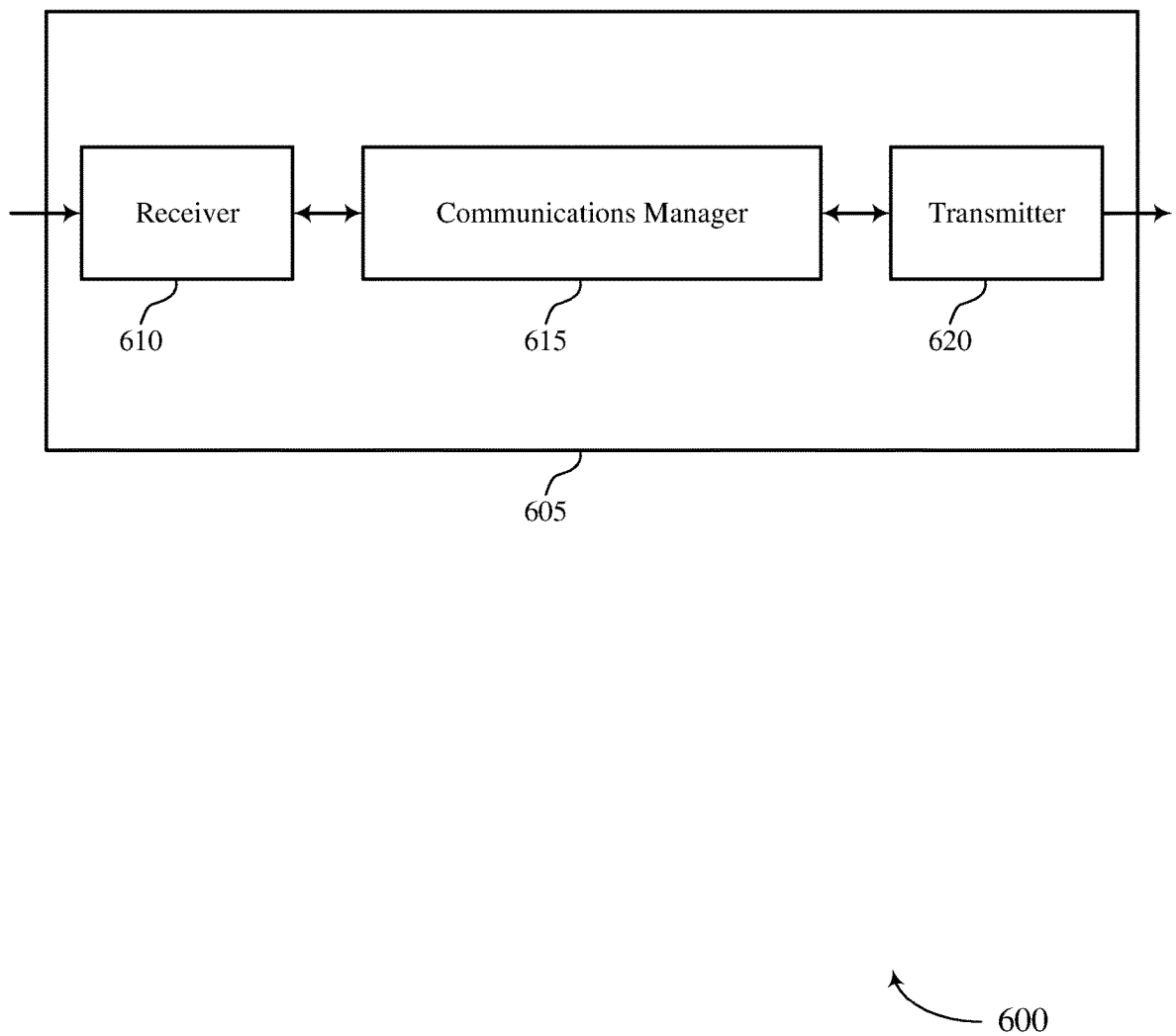
FIGS. 6 and 7 show block diagrams of devices that support timing adjustment in non-terrestrial wireless communications in accordance with aspects of the present disclosure.

FIG. 6 shows a block diagram 600 of a device 605 that supports timing adjustment in non-terrestrial wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to timing adjustment in non-terrestrial wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify, based on round trip delay information received from a network (e.g., via a base station or another network node), a propagation delay for communications between the UE and the base station via a satellite, determine, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to the UE or movement of the satellite relative to both the UE and the base station, and transmit the uplink communication to the base station via the satellite based on the uplink timing. The communications manager 615 may be an example of aspects of the communications manager 910 described herein.

The communications manager 615 may as described herein be implemented to realize one or more potential advantages. One implementation may allow the device 605 to provide communications with high-altitude vehicles (e.g., satellites or other non-terrestrial-based equipment), user terminals, and base stations, in non-terrestrial networks, among other advantages. Further, implementations may support increased spectral efficiency and, in some examples, may promote higher mobility support for user terminals in non-terrestrial networks compared to terrestrial networks, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
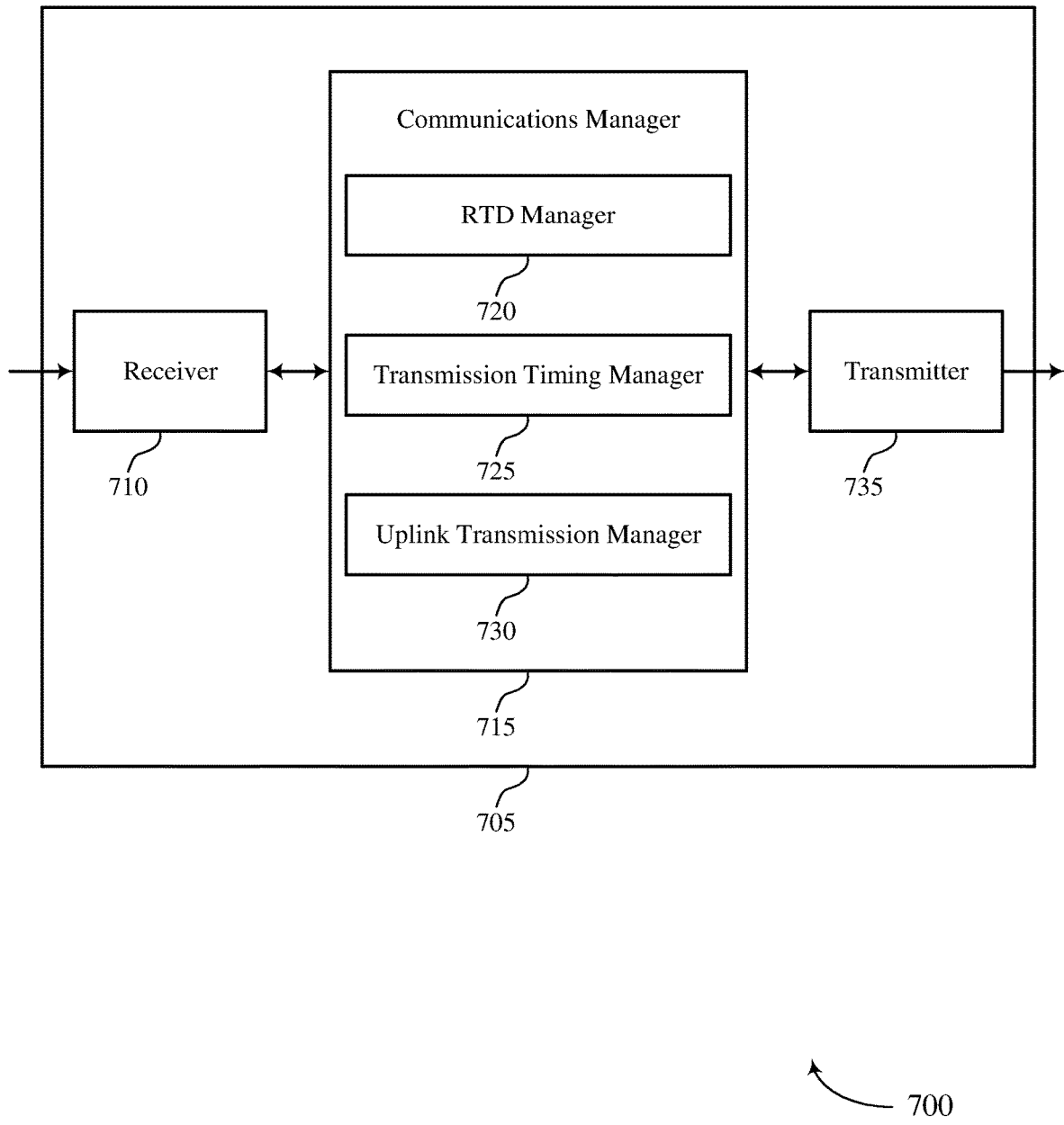

FIG. 7 shows a block diagram 700 of a device 705 that supports timing adjustment in non-terrestrial wireless communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to timing adjustment in non-terrestrial wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an RTD manager 720, a transmission timing manager 725, and an uplink transmission manager 730. The communications manager 715 may be an example of aspects of the communications manager 910 described herein.

The RTD manager 720 may identify, based on round trip delay information received from a network, a propagation delay for communications between the UE and a base station via a satellite.

The transmission timing manager 725 may determine, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to the UE or movement of the satellite relative to both the UE and the base station.

The uplink transmission manager 730 may transmit the uplink communication to the base station via the satellite based on the uplink timing.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
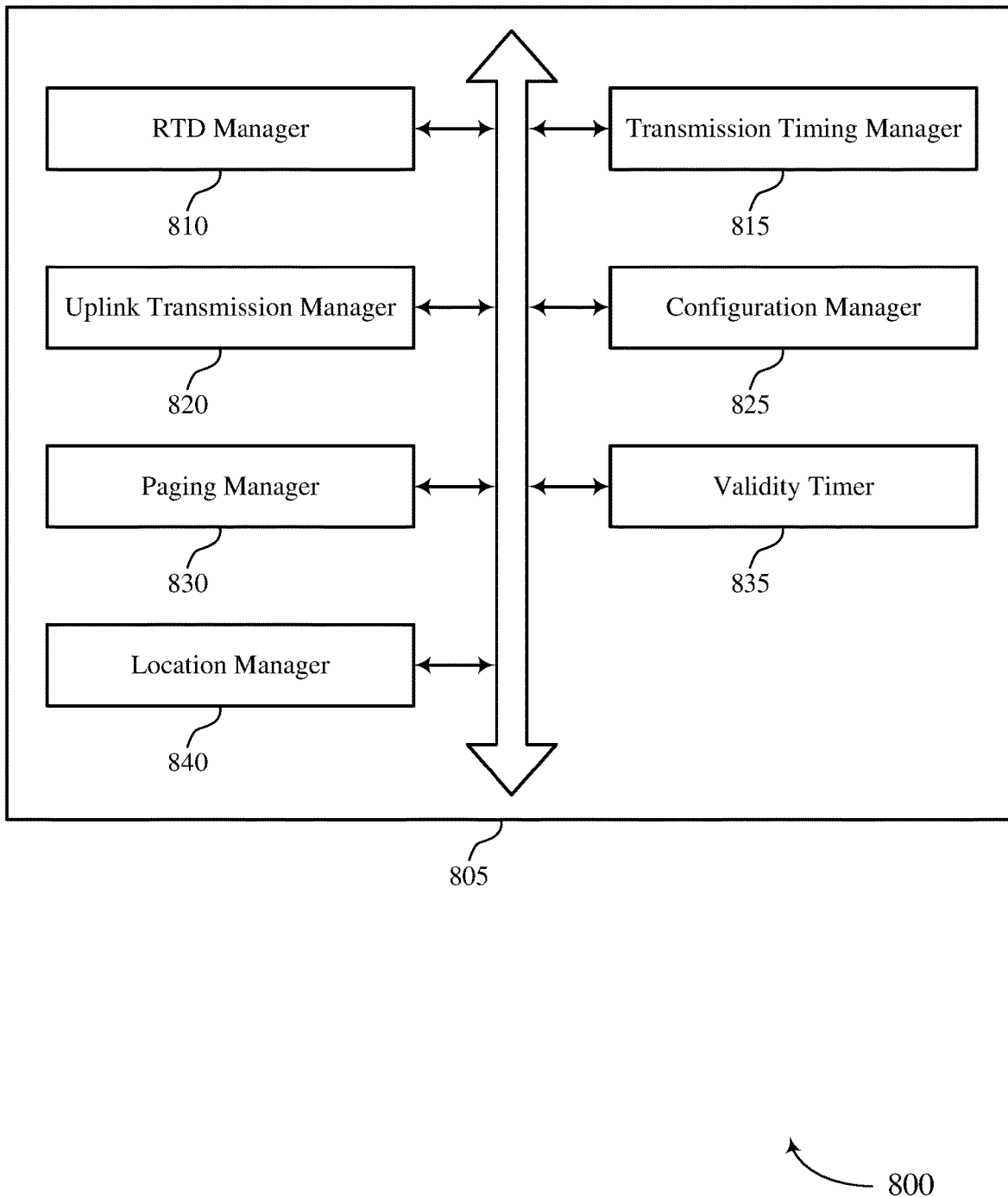
FIG. 8 shows a block diagram of a communications manager that supports timing adjustment in non-terrestrial wireless communications in accordance with aspects of the present disclosure.

FIG. 8 shows a block diagram 800 of a communications manager 805 that supports timing adjustment in non-terrestrial wireless communications in accordance with aspects of the present disclosure. The communications manager 805 may be an example of aspects of a communications manager 615, a communications manager 715, or a communications manager 910 described herein. The communications manager 805 may include an RTD manager 810, a transmission timing manager 815, an uplink transmission manager 820, a configuration manager 825, a paging manager 830, a validity timer 835, and a location manager 840. Each of these modules may communicate, directly or indirectly, with one another (e.g., via one or more buses).

The RTD manager 810 may identify, based on round trip delay information received from a network (e.g., via a base station or another network node), a propagation delay for communications between the UE and the base station via a satellite. In some examples, the RTD manager 810 may determine a first portion of the propagation delay and a first propagation delay variation for a UE-to-satellite link. In some examples, the RTD manager 810 may determine a second portion of the propagation delay and a second propagation delay variation for a satellite-to-base station link. In some examples, the propagation delay for communications between the UE and the base station is based on one or more of the first portion of the propagation delay, the first propagation delay variation, the second portion of the propagation delay, or the second propagation delay variation.

In some examples, the RTD manager 810 may receive a broadcast transmission (e.g., from the base station) that includes the round trip delay information, and where the broadcast transmission is periodically broadcast at a first periodicity. In some cases, the round trip delay information includes an initial value of the propagation delay for use in an initial access procedure, and where the propagation delay variation is determined subsequent to the initial access procedure based on a duration in which a plurality of propagation delays are determined. In some cases, the round trip delay information includes a satellite-to-base station propagation delay, and where the UE determines a UE-to-satellite propagation delay, and where the propagation delay variation is determined based on a duration in which a plurality of propagation delays are determined. In some cases, the round trip delay information further includes a UE-to-satellite propagation delay. In some cases, a midpoint of a transmission beam coverage area for a transmission beam used for communications with the UE is considered as a location of the UE for the UE-to-satellite propagation delay.

In some cases, the round trip delay information includes a base station-to-UE propagation delay for use in an initial access procedure, and where the propagation delay variation is determined subsequent to the initial access procedure. In some cases, the round trip delay information includes the propagation delay and the propagation delay variation. In some cases, the propagation delay is transmitted at a first periodicity, and the propagation delay variation is transmitted at a second periodicity that is different than the first periodicity. In some cases, the first periodicity is a first predefined fixed periodicity or is configured in signaling transmitted to the UE, and where the second periodicity is a second predefined fixed periodicity or is configured in signaling transmitted to the UE. In some cases, the propagation delay is provided in broadcast signaling, and the propagation delay variation is provided in dedicated signaling to the UE.

In some cases, the round trip delay information includes an indication of the propagation delay and is provided periodically, and where the propagation delay variation is determined based on differences between two or more instances of the propagation delay provided. In some cases, the propagation delay variation is determined based on a difference between two instances of the propagation delay and a time difference between receipt of the two instances of the propagation delay.

The transmission timing manager 815 may determine, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to the UE or movement of the satellite relative to both the UE and the base station. In some cases, the uplink timing for initiating the uplink communication to the base station is based on the satellite timing reference, and a UE-to-satellite propagation delay and a UE-to-satellite propagation delay variation, irrespective of a satellite-to-base station propagation delay or a satellite-to-base station propagation delay variability.

The uplink transmission manager 820 may transmit the uplink communication to the base station via the satellite based on the uplink timing. The configuration manager 825 may receive, from the base station, configuration information that indicates whether the uplink timing is based on the satellite timing reference and a UE-to-satellite propagation delay, or is based on the base station timing reference and a UE-to-gateway propagation delay. In some examples, the configuration information further provides a round trip delay offset associated with the base station and the satellite, and a round trip delay variation associated with the base station and the satellite. In some cases, the configuration information is provided in a system information broadcast transmission from the base station, or in UE-specific signaling from the base station.

In some cases, the configuration information indicates that the uplink timing is relative to the base station timing reference. In some cases, the configuration information indicates that the uplink timing is based on the satellite timing reference, and where the uplink timing is determined based only on the UE-to-satellite propagation delay and the UE-to-satellite propagation delay variation. In some cases, the configuration information is received in a master information block (MIB) from the base station.

The paging manager 830 may receive paging information from the base station to update the propagation delay or propagation delay variation information. In some cases, the paging information is provided in an indication bit in a downlink control information paging indication, in a direct indication in downlink control information, or in a paging indication that is scrambled with a radio network temporary identifier (RNTI) that is associated with a round trip delay information update.

The validity timer 835 may identify a validity time associated with the round trip delay information. In some examples, the validity timer 835 may monitor for updated round trip delay information responsive to an expiration of the validity time. In some cases, the validity time is based on a predefined modification period or is based on receiving configuration information from the network that configures a modification period, where the UE monitors for the updated round trip delay information once per modification period. In some cases, the validity time starts when a SIB that contains the round trip delay information is acquired, and where the monitoring for the updated round trip delay information includes acquiring another instance of the SIB.

The location manager 840 may determine one or more of the propagation delay or the propagation delay variation based on one or more of information from a global navigation satellite system (GNSS) component at the UE, ephemeris information associated with the satellite, information provided by the base station, or any combinations thereof.

In some examples, the location manager 840 may receive an indication of a base station location in the round trip delay information. In some examples, the location manager 840 may determine one or more of the propagation delay or the propagation delay variation based on the base station location, a UE location, and a satellite location. In some cases, the base station location is provided in radio resource control signaling when the UE is in a connected mode with the base station. In some cases, the base station location is a virtual geo-location that allows for determination of the propagation delay variation, and is provided in dedicated signaling to the UE or in broadcast signaling from the base station.

Figure 9:
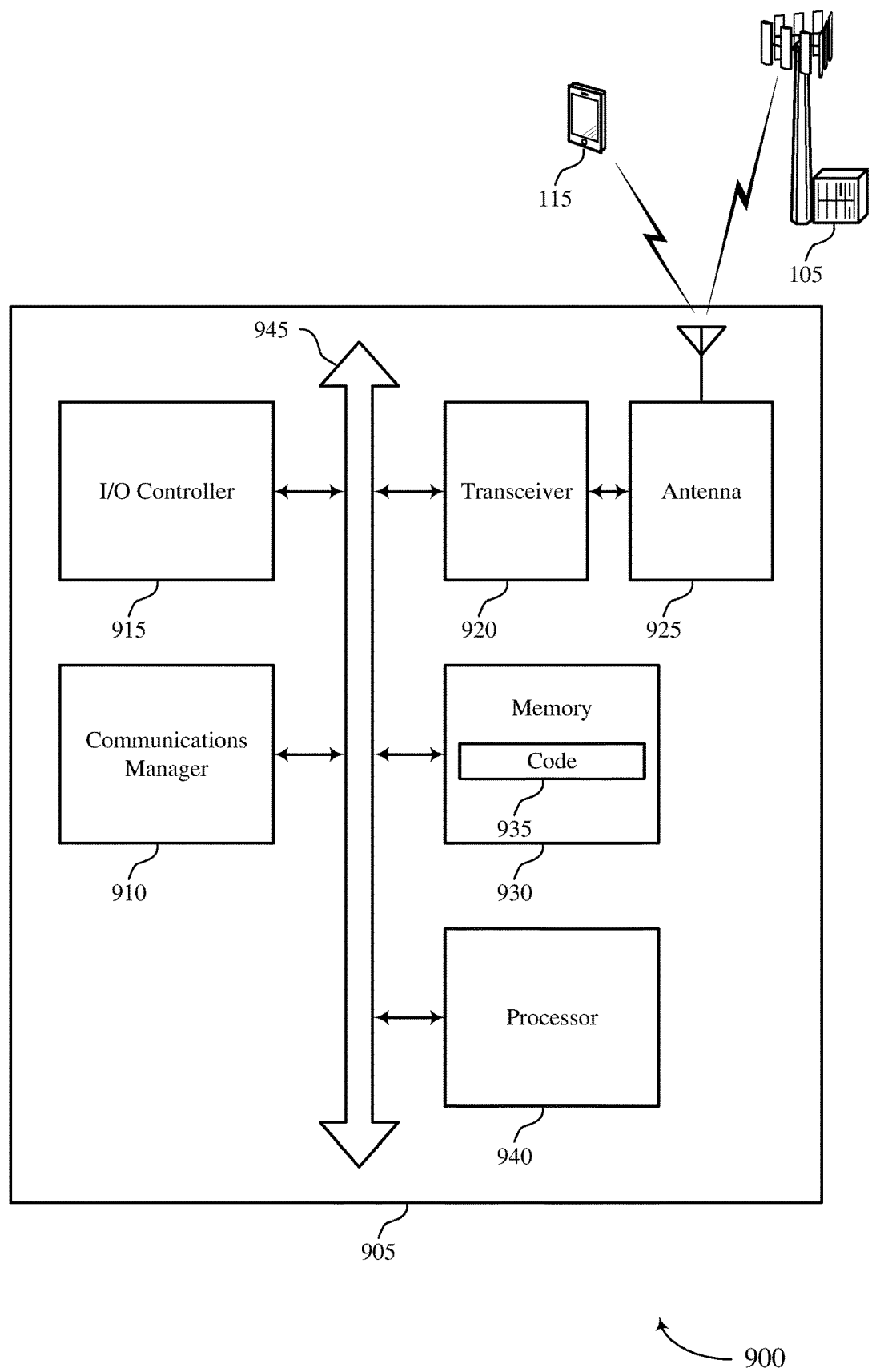
FIG. 9 shows a diagram of a system including a device that supports timing adjustment in non-terrestrial wireless communications in accordance with aspects of the present disclosure.

FIG. 9 shows a diagram of a system 900 including a device 905 that supports timing adjustment in non-terrestrial wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify, based on round trip delay information received from a network, a propagation delay for communications between the UE and a base station via a satellite, determine, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to the UE or movement of the satellite relative to both the UE and the base station, and transmit the uplink communication to the base station via the satellite based on the uplink timing.

The communications manager 910 may as described herein be implemented to realize one or more potential advantages. One implementation may allow the device 905 to provide communications with high-altitude vehicles (e.g., satellites or other non-terrestrial-based equipment), user terminals, and base stations, in non-terrestrial networks, among other advantages. Further, implementations may support increased spectral efficiency and, in some examples, may promote higher mobility support for user terminals in non-terrestrial networks compared to terrestrial networks, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting timing adjustment in non-terrestrial wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
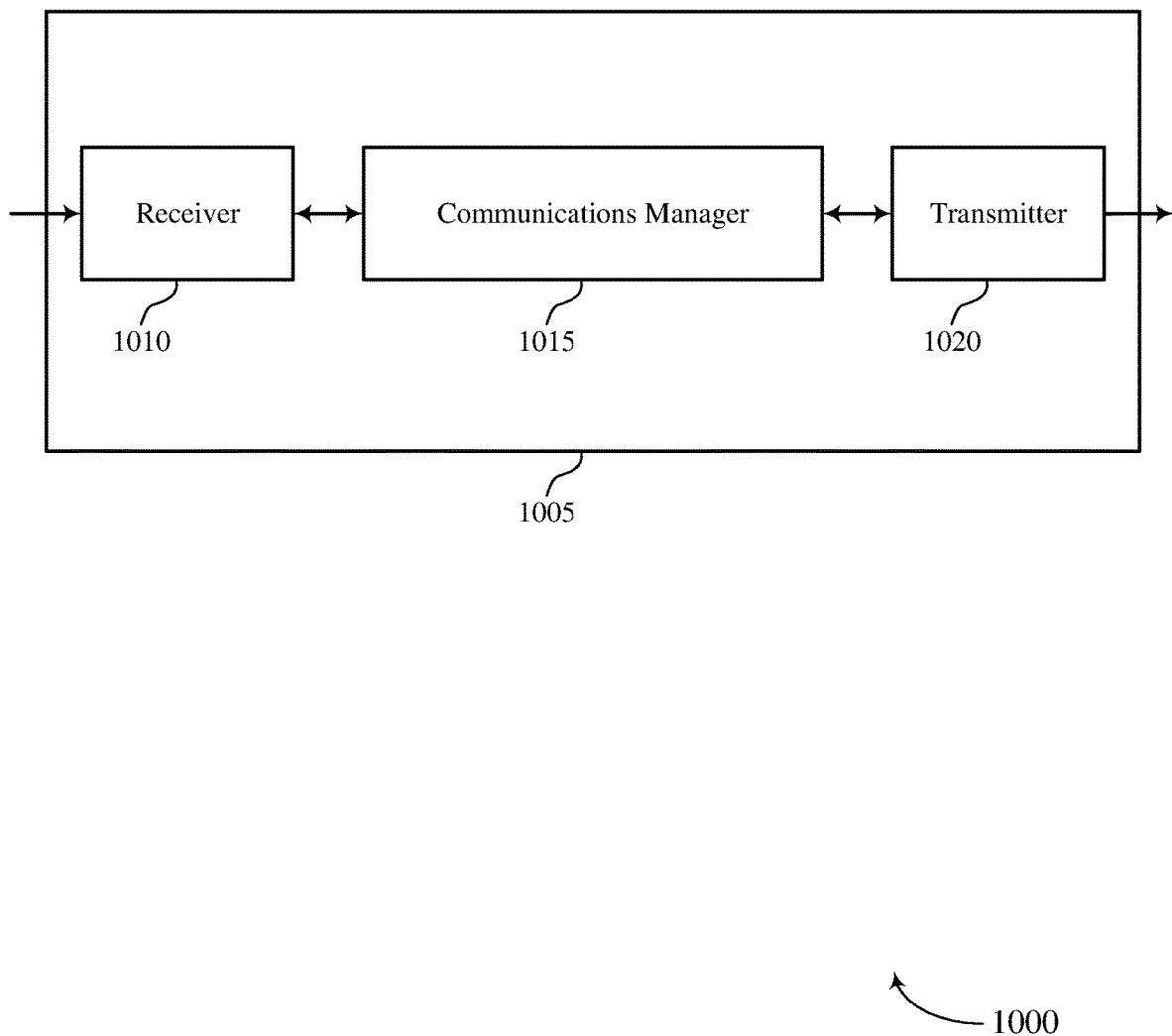
FIGS. 10 and 11 show block diagrams of devices that support timing adjustment in non-terrestrial wireless communications in accordance with aspects of the present disclosure.

FIG. 10 shows a block diagram 1000 of a device 1005 that supports timing adjustment in non-terrestrial wireless communications in accordance with aspects of the present disclosure. The device 1005 may be an example of aspects of a base station 105 or gateway as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to timing adjustment in non-terrestrial wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify round trip delay information associated with a propagation delay for communications with at least a first UE via a satellite, determine configuration information based on the round trip delay information, the configuration information indicating that the first UE is to identify an uplink timing for uplink communications to the base station via the satellite based on a satellite timing reference or a base station timing reference, where the uplink timing is based on the propagation delay and a propagation delay variation, and where the propagation delay variation is based on movement of the satellite relative to the UE or movement of the satellite relative to both the UE and the base station, and transmit the configuration information to at least the first UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
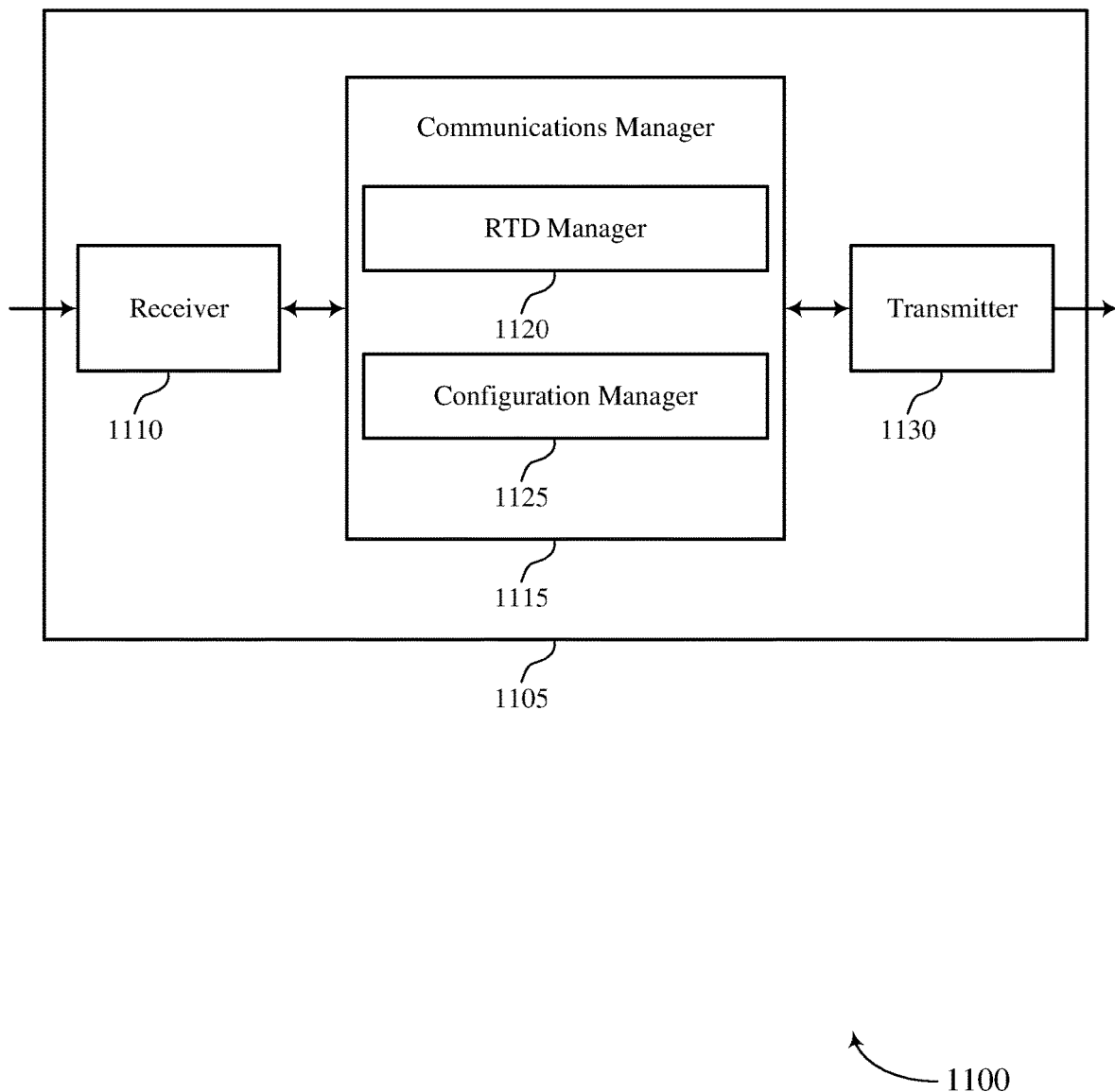

FIG. 11 shows a block diagram 1100 of a device 1105 that supports timing adjustment in non-terrestrial wireless communications in accordance with aspects of the present disclosure. The device 1105 may be an example of aspects of a device 1005, a base station 105, or gateway, as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to timing adjustment in non-terrestrial wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an RTD manager 1120 and a configuration manager 1125. The communications manager 1115 may be an example of aspects of the communications manager 1310 described herein.

The RTD manager 1120 may identify round trip delay information associated with a propagation delay for communications with at least a first UE via a satellite.

The configuration manager 1125 may determine configuration information based on the round trip delay information, the configuration information indicating that the first UE is to identify an uplink timing for uplink communications to the base station via the satellite based on a satellite timing reference or a base station timing reference, where the uplink timing is based on the propagation delay and a propagation delay variation, and where the propagation delay variation is based on movement of the satellite relative to the UE or movement of the satellite relative to both the UE and the base station and transmit the configuration information to at least the first UE.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
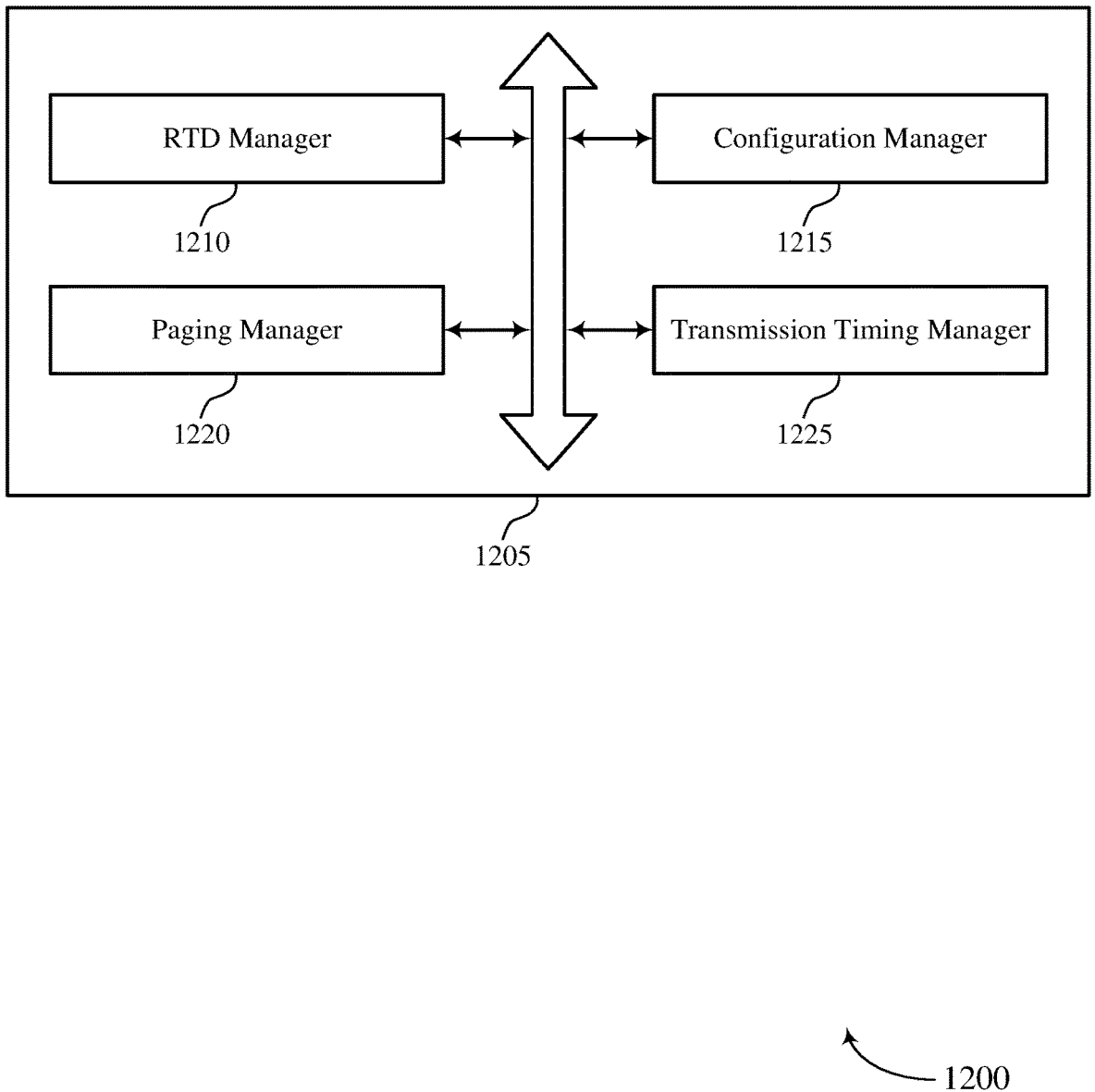
FIG. 12 shows a block diagram of a communications manager that supports timing adjustment in non-terrestrial wireless communications in accordance with aspects of the present disclosure.

FIG. 12 shows a block diagram 1200 of a communications manager 1205 that supports timing adjustment in non-terrestrial wireless communications in accordance with aspects of the present disclosure. The communications manager 1205 may be an example of aspects of a communications manager 1015, a communications manager 1115, or a communications manager 1310 described herein. The communications manager 1205 may include an RTD manager 1210, a configuration manager 1215, a paging manager 1220, and a transmission timing manager 1225. Each of these modules may communicate, directly or indirectly, with one another (e.g., via one or more buses).

The RTD manager 1210 may identify round trip delay information associated with a propagation delay for communications with at least a first UE via a satellite.

The configuration manager 1215 may determine configuration information based on the round trip delay information, the configuration information indicating that the first UE is to identify an uplink timing for uplink communications to the base station via the satellite based on a satellite timing reference or a base station timing reference, where the uplink timing is based on the propagation delay and a propagation delay variation, and where the propagation delay variation is based on movement of the satellite relative to the UE or movement of the satellite relative to both the UE and the base station. In some examples, the configuration manager 1215 may transmit the configuration information to at least the first UE. In some examples, the configuration information further provides a round trip delay offset associated with the base station and the satellite, and a round trip delay variation associated with the base station and the satellite.

In some examples, the configuration manager 1215 may periodically transmit instances of the configuration information with updated round trip delay information. In some cases, the configuration information includes a variable that indicates whether the uplink timing is based on the satellite timing reference and a UE-to-satellite propagation delay, or is based on the base station timing reference and a UE-to-base station propagation delay based at least in part on a value of the variable. In some cases, the configuration information is transmitted in a system information broadcast transmission from the base station, or in UE-specific signaling to the first UE. In some cases, the configuration information indicates that the uplink timing is relative to the base station timing reference. In some cases, the configuration information indicates that the uplink timing is based on the satellite timing reference, and where the uplink timing is determined based only on the UE-to-satellite propagation delay. In some cases, the configuration information is transmitted in a master information block (MIB). In some cases, a periodicity for transmitting the instances of the configuration information with the updated round trip delay information is based on a predefined modification period or a configured modification period indicated in the configuration information.

The paging manager 1220 may transmit a paging message to at least the first UE that indicates the first UE is to update the round trip delay information. In some cases, the paging message to update the round trip delay information is provided in an indication bit in a downlink control information paging indication, in a direct indication in downlink control information, or in a paging indication that is scrambled with a radio network temporary identifier (RNTI) that is associated with a round trip delay information update.

The transmission timing manager 1225 may determine uplink transmission timing for uplink communications. In some cases, the round trip delay information includes an initial value of the propagation delay for use in an initial access procedure, and where the propagation delay variation is determined subsequent to the initial access procedure based on a duration in which a plurality of propagation delays are determined.

Figure 13:
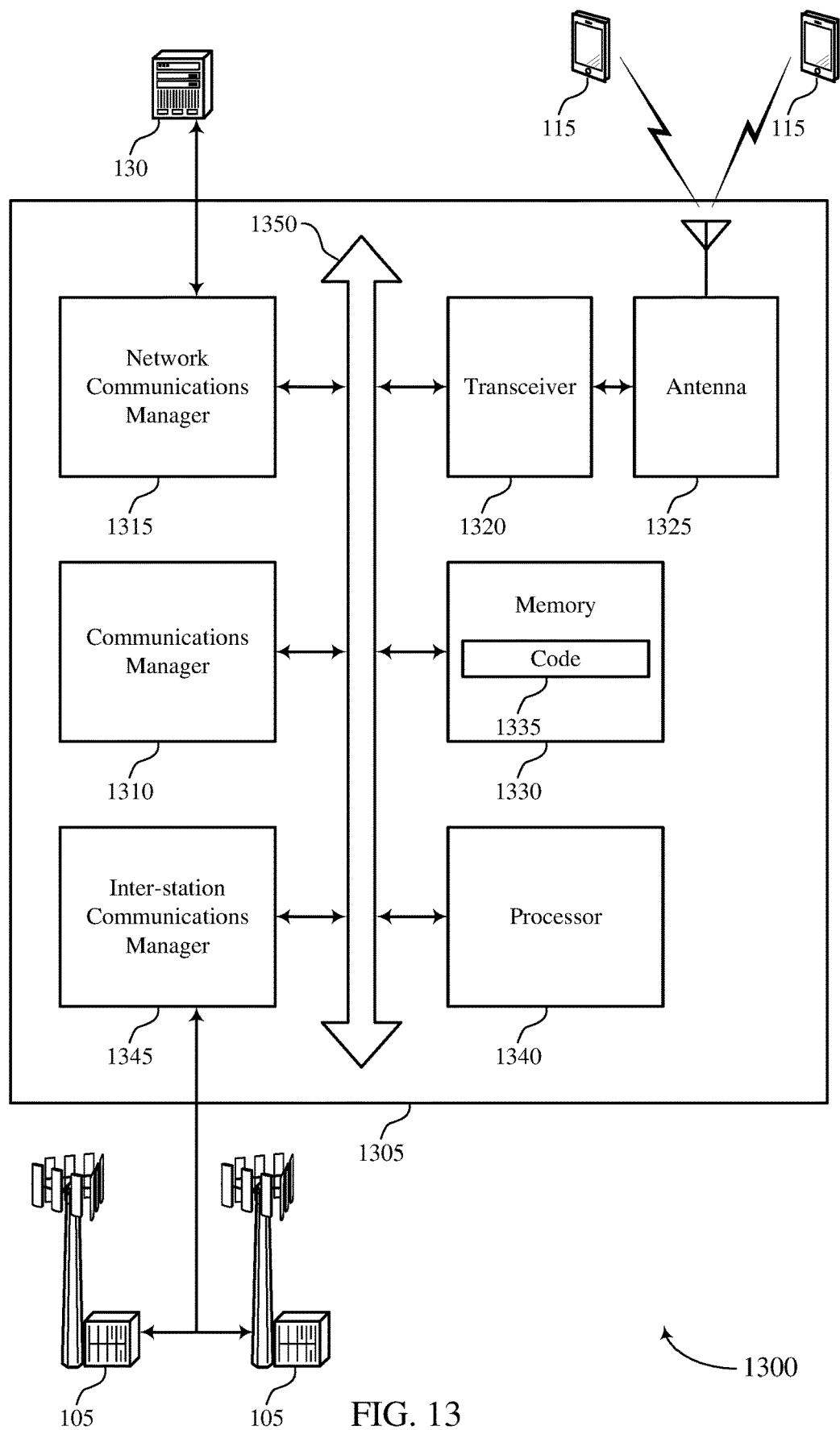
FIG. 13 shows a diagram of a system including a device that supports timing adjustment in non-terrestrial wireless communications in accordance with aspects of the present disclosure.

FIG. 13 shows a diagram of a system 1300 including a device 1305 that supports timing adjustment in non-terrestrial wireless communications in accordance with aspects of the present disclosure. The device 1305 may be an example of or include the components of device 1005, device 1105, a base station 105, or gateway, as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify round trip delay information associated with a propagation delay for communications with at least a first UE via a satellite, determine configuration information based on the round trip delay information, the configuration information indicating that the first UE is to identify an uplink timing for uplink communications to the base station via the satellite based on a satellite timing reference or a base station timing reference, where the uplink timing is based on the propagation delay and a propagation delay variation, and where the propagation delay variation is based on movement of the satellite relative to the UE or movement of the satellite relative to both the UE and the base station, and transmit the configuration information to at least the first UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting timing adjustment in non-terrestrial wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
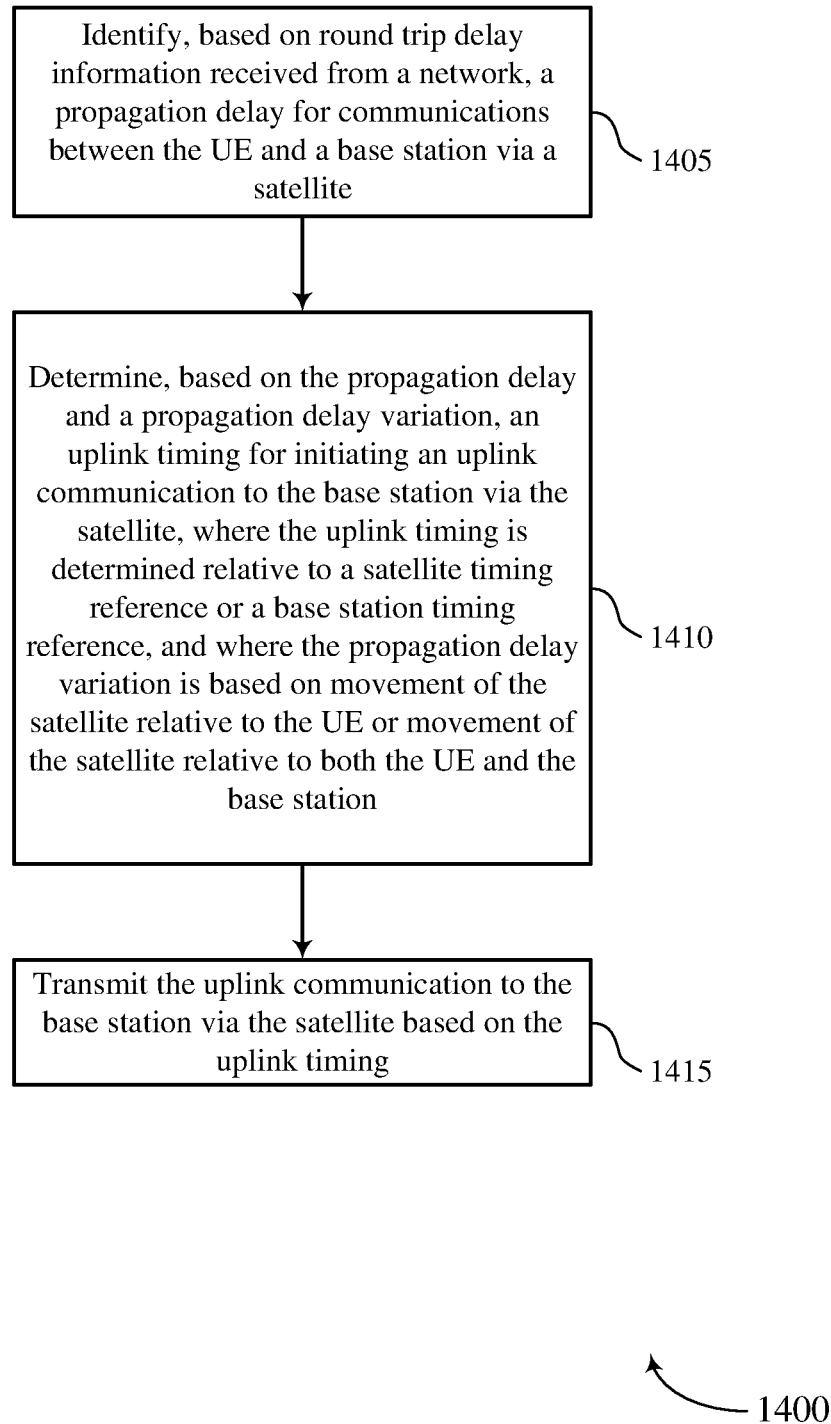
FIGS. 14 through 18 show flowcharts illustrating methods that support timing adjustment in non-terrestrial wireless communications in accordance with aspects of the present disclosure.

FIG. 14 shows a flowchart illustrating a method 1400 that supports timing adjustment in non-terrestrial wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify, based on round trip delay information received from a network (e.g., from a base station or another network node), a propagation delay for communications between the UE and the base station via a satellite. The operations of 1405 may be performed according to the methods described herein. In some examples, aspects of the operations of 1405 may be performed by an RTD manager as described with reference to FIGS. 6 through 9.

At 1410, the UE may determine, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to the UE or movement of the satellite relative to both the UE and the base station. The operations of 1410 may be performed according to the methods described herein. In some examples, aspects of the operations of 1410 may be performed by a transmission timing manager as described with reference to FIGS. 6 through 9.

At 1415, the UE may transmit the uplink communication to the base station via the satellite based on the uplink timing. The operations of 1415 may be performed according to the methods described herein. In some examples, aspects of the operations of 1415 may be performed by an uplink transmission manager as described with reference to FIGS. 6 through 9.

Figure 15:
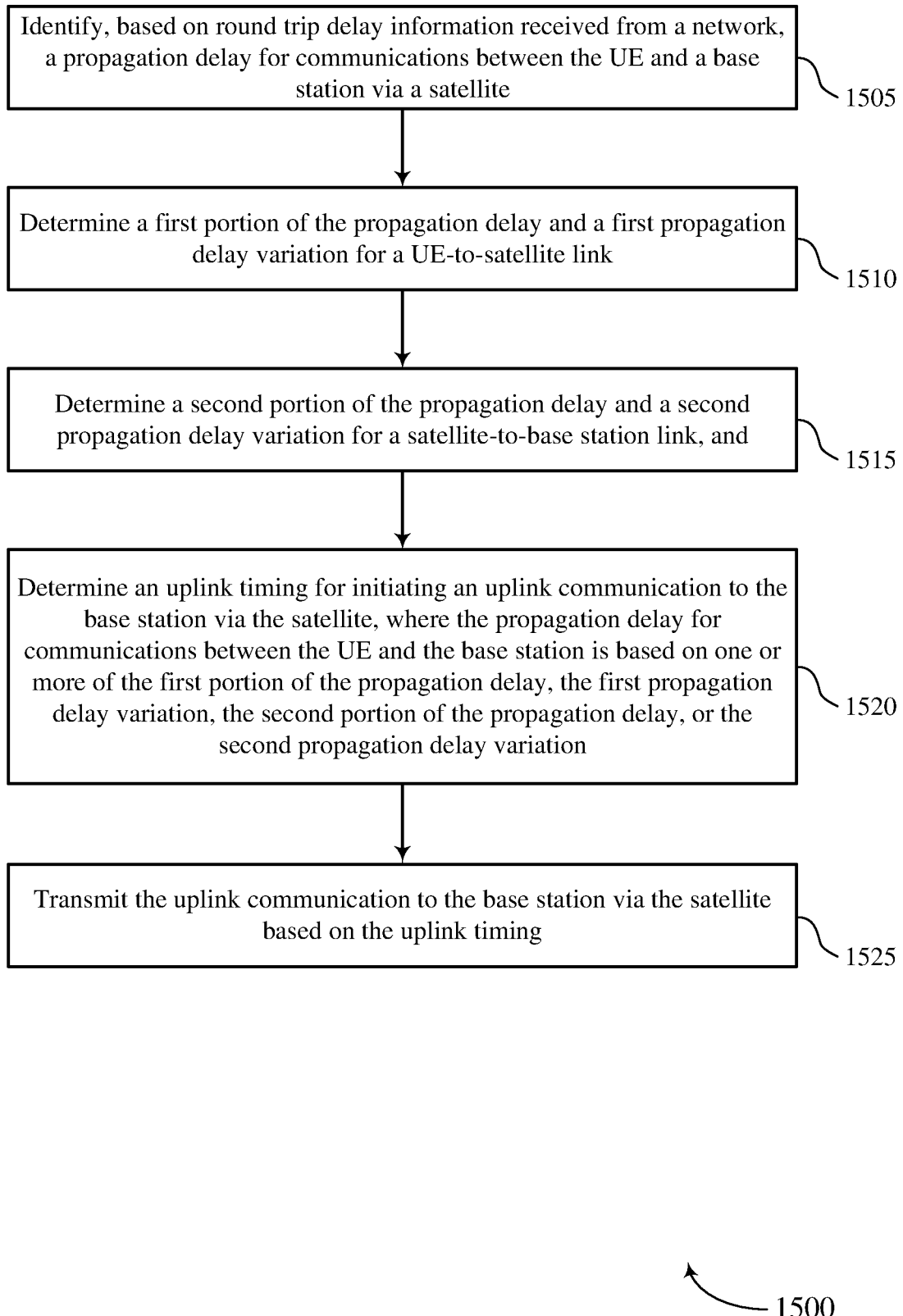

FIG. 15 shows a flowchart illustrating a method 1500 that supports timing adjustment in non-terrestrial wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify, based on round trip delay information received from a network, a propagation delay for communications between the UE and a base station via a satellite. The operations of 1505 may be performed according to the methods described herein. In some examples, aspects of the operations of 1505 may be performed by an RTD manager as described with reference to FIGS. 6 through 9.

At 1510, the UE may determine a first portion of the propagation delay and a first propagation delay variation for a UE-to-satellite link. The operations of 1510 may be performed according to the methods described herein. In some examples, aspects of the operations of 1510 may be performed by an RTD manager as described with reference to FIGS. 6 through 9.

At 1515, the UE may determine a second portion of the propagation delay and a second propagation delay variation for a satellite-to-base station link. The operations of 1515 may be performed according to the methods described herein. In some examples, aspects of the operations of 1515 may be performed by an RTD manager as described with reference to FIGS. 6 through 9.

At 1520, the UE may determine an uplink timing for initiating an uplink communication to the base station via the satellite, where the propagation delay for communications between the UE and the base station is based on one or more of the first portion of the propagation delay, the first propagation delay variation, the second portion of the propagation delay, or the second propagation delay variation. The operations of 1520 may be performed according to the methods described herein. In some examples, aspects of the operations of 1520 may be performed by a transmission timing manager as described with reference to FIGS. 6 through 9.

At 1525, the UE may transmit the uplink communication to the base station via the satellite based on the uplink timing. The operations of 1525 may be performed according to the methods described herein. In some examples, aspects of the operations of 1530 may be performed by an uplink transmission manager as described with reference to FIGS. 6 through 9.

Figure 16:
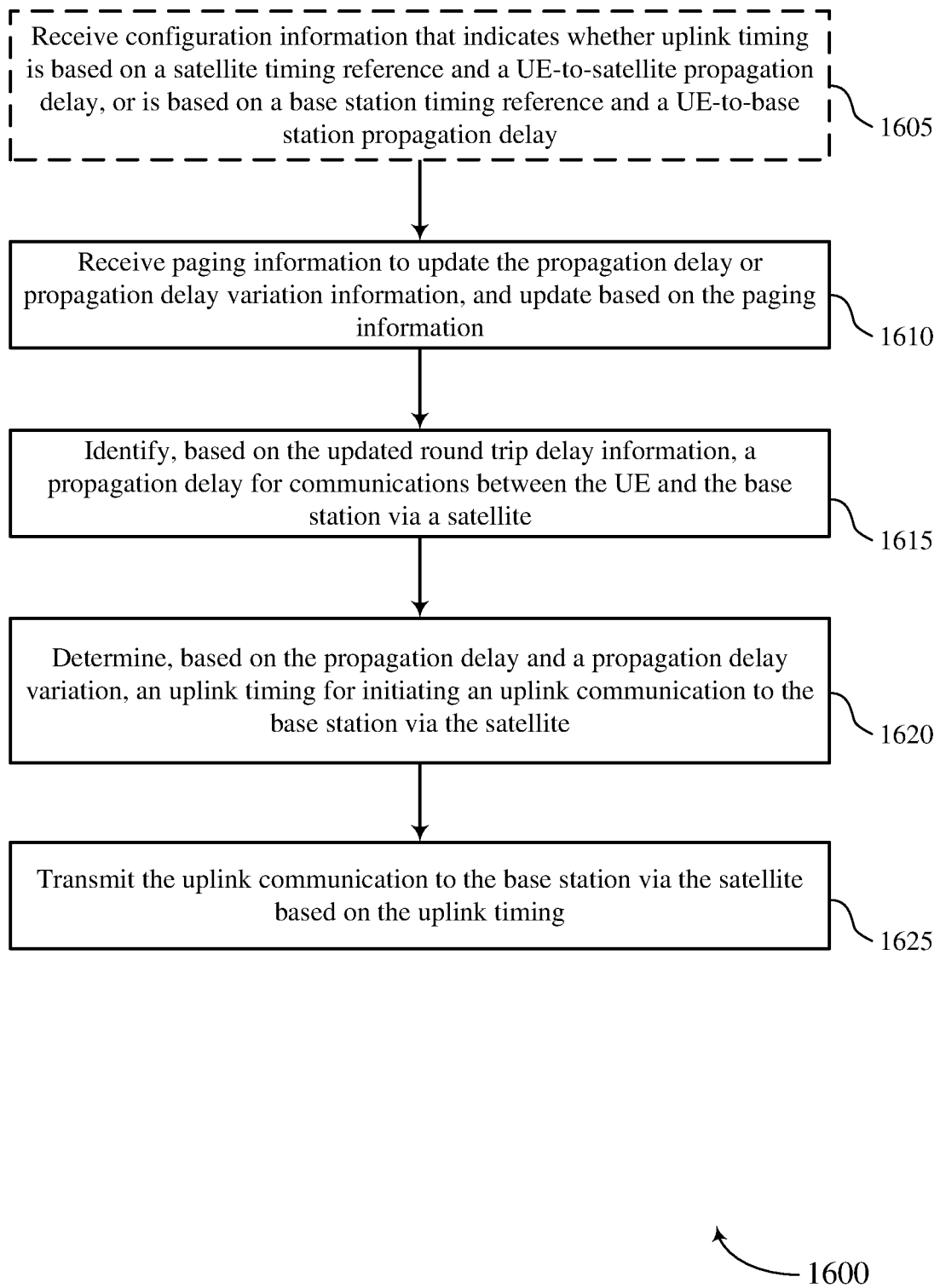

FIG. 16 shows a flowchart illustrating a method 1600 that supports timing adjustment in non-terrestrial wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

Optionally, at 1605, the UE may receive configuration information that indicates whether uplink timing is based on a satellite timing reference and a UE-to-satellite propagation delay, or is based on a base station timing reference and a UE-to-gateway propagation delay. The operations of 1605 may be performed according to the methods described herein. In some examples, aspects of the operations of 1605 may be performed by a configuration manager as described with reference to FIGS. 6 through 9.

At 1610, the UE may receive paging information to update the propagation delay or propagation delay variation information and update based on the paging information. The operations of 1610 may be performed according to the methods described herein. In some examples, aspects of the operations of 1610 may be performed by a paging manager as described with reference to FIGS. 6 through 9. In some cases, the paging information is provided in an indication bit in a downlink control information paging indication, in a direct indication in downlink control information, or in a paging indication that is scrambled with a RNTI that is associated with a round trip delay information update.

At 1615, the UE may identify, based on the updated round trip delay information, a propagation delay for communications between the UE and the base station via a satellite. The operations of 1615 may be performed according to the methods described herein. In some examples, aspects of the operations of 1615 may be performed by an RTD manager as described with reference to FIGS. 6 through 9.

At 1620, the UE may determine, based on the propagation delay and a propagation delay variation, an uplink timing for initiating an uplink communication to the base station via the satellite. The operations of 1620 may be performed according to the methods described herein. In some examples, aspects of the operations of 1620 may be performed by a transmission timing manager as described with reference to FIGS. 6 through 9.

At 1625, the UE may transmit the uplink communication to the base station via the satellite based on the uplink timing. The operations of 1625 may be performed according to the methods described herein. In some examples, aspects of the operations of 1625 may be performed by an uplink transmission manager as described with reference to FIGS. 6 through 9.

Figure 17:
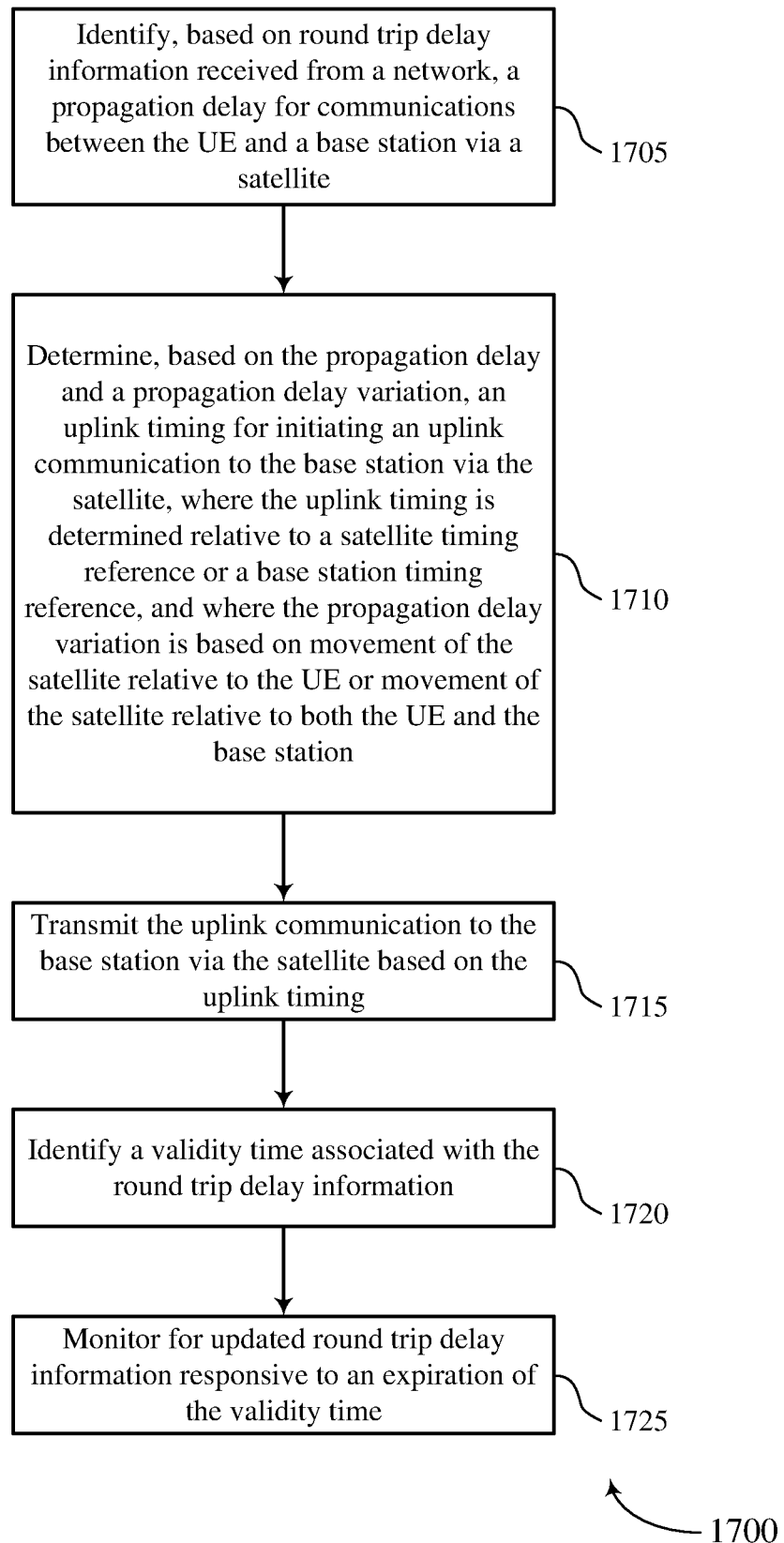

FIG. 17 shows a flowchart illustrating a method 1700 that supports timing adjustment in non-terrestrial wireless communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may identify, based on round trip delay information received from a network, a propagation delay for communications between the UE and a base station via a satellite. The operations of 1705 may be performed according to the methods described herein. In some examples, aspects of the operations of 1705 may be performed by an RTD manager as described with reference to FIGS. 6 through 9.

At 1710, the UE may determine, based on the propagation delay and a propagation delay variation, an uplink timing for initiating an uplink communication to the base station via the satellite, where the uplink timing is determined relative to a satellite timing reference or a base station timing reference, and where the propagation delay variation is based on movement of the satellite relative to the UE or movement of the satellite relative to both the UE and the base station. The operations of 1710 may be performed according to the methods described herein. In some examples, aspects of the operations of 1710 may be performed by a transmission timing manager as described with reference to FIGS. 6 through 9.

At 1715, the UE may transmit the uplink communication to the base station via the satellite based on the uplink timing. The operations of 1715 may be performed according to the methods described herein. In some examples, aspects of the operations of 1715 may be performed by an uplink transmission manager as described with reference to FIGS. 6 through 9.

At 1720, the UE may identify a validity time associated with the round trip delay information. The operations of 1720 may be performed according to the methods described herein. In some examples, aspects of the operations of 1720 may be performed by a validity timer as described with reference to FIGS. 6 through 9.

At 1725, the UE may monitor for updated round trip delay information responsive to an expiration of the validity time.

The operations of 1725 may be performed according to the methods described herein. In some examples, aspects of the operations of 1725 may be performed by a validity timer as described with reference to FIGS. 6 through 9.

Figure 18:
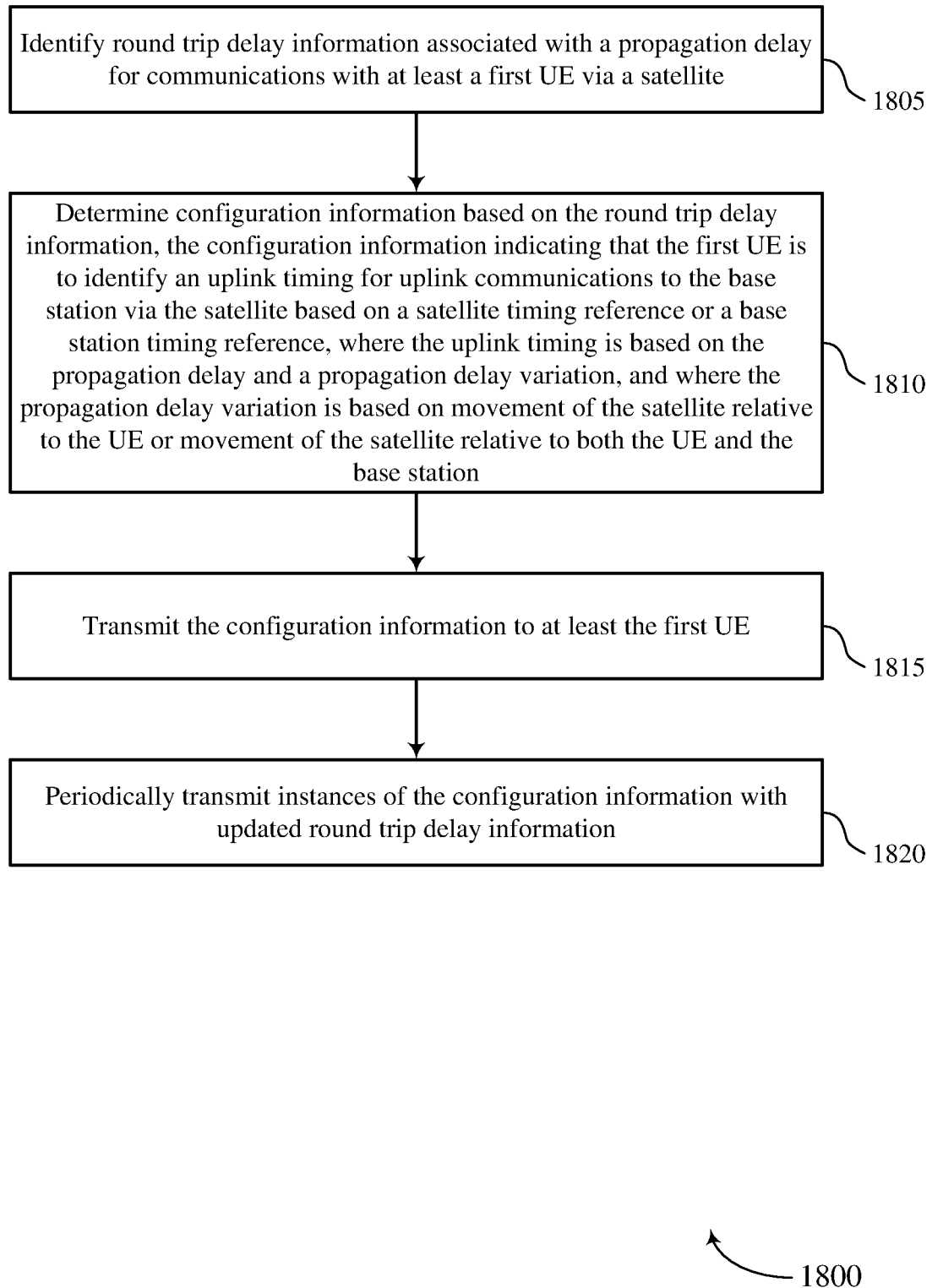

FIG. 18 shows a flowchart illustrating a method 1800 that supports timing adjustment in non-terrestrial wireless communications in accordance with aspects of the present disclosure. The operations of method 1800 may be implemented by a base station 105, or gateway, or its components as described herein. For example, the operations of method 1800 may be performed by a communications manager as described with reference to FIGS. 10 through 13. In some examples, a base station or gateway may execute a set of instructions to control the functional elements of the base station or gateway to perform the functions described herein. Additionally or alternatively, a base station or gateway may perform aspects of the functions described herein using special-purpose hardware.

At 1805, the base station or gateway may identify round trip delay information associated with a propagation delay for communications with at least a first UE via a satellite. The operations of 1805 may be performed according to the methods described herein. In some examples, aspects of the operations of 1805 may be performed by an RTD manager as described with reference to FIGS. 10 through 13.

At 1810, the base station or gateway may determine configuration information based on the round trip delay information, the configuration information indicating that the first UE is to identify an uplink timing for uplink communications to the base station via the satellite based on a satellite timing reference or a base station timing reference, where the uplink timing is based on the propagation delay and a propagation delay variation, and where the propagation delay variation is based on movement of the satellite relative to the UE or movement of the satellite relative to both the UE and the base station. The operations of 1810 may be performed according to the methods described herein. In some examples, aspects of the operations of 1810 may be performed by a configuration manager as described with reference to FIGS. 10 through 13.

At 1815, the base station or gateway may transmit the configuration information to at least the first UE. The operations of 1815 may be performed according to the methods described herein. In some examples, aspects of the operations of 1815 may be performed by a configuration manager as described with reference to FIGS. 10 through 13.

At 1820, the base station or gateway may periodically transmit instances of the configuration information with updated round trip delay information. The operations of 1820 may be performed according to the methods described herein. In some examples, aspects of the operations of 1820 may be performed by a configuration manager as described with reference to FIGS. 10 through 13. In some cases, a periodicity for transmitting the instances of the configuration information with the updated round trip delay information is based on a predefined modification period or a configured modification period indicated in the configuration information.

The following provides an overview of aspects of the present disclosure:

Aspect 1: A method for wireless communication at a UE, comprising: identifying, based at least in part on round trip delay information received from a network, a propagation delay for communications between the UE and a base station via a satellite; determining, based at least in part on the propagation delay and a propagation delay variation, an uplink timing for initiating an uplink communication to the base station via the satellite, wherein the uplink timing is determined relative to a satellite timing reference or a base station timing reference, and wherein the propagation delay variation is based at least in part on movement of the satellite relative to the UE or movement of the satellite relative to both the UE and the base station; and transmitting the uplink communication to the base station via the satellite based at least in part on the uplink timing.

Aspect 2: The method of aspect 1, further comprising: determining a first portion of the propagation delay and a first propagation delay variation for a UE-to-satellite link; determining a second portion of the propagation delay and a second propagation delay variation for a satellite-to-base station link; and wherein the propagation delay for communications between the UE and the base station is based at least in part on one or more of the first portion of the propagation delay, the first propagation delay variation, the second portion of the propagation delay, or the second propagation delay variation.

Aspect 3: The method of any of aspects 1 through 2, further comprising: receiving configuration information that indicates whether the uplink timing is based on the satellite timing reference and a UE-to-satellite propagation delay, or is based on the base station timing reference and a UE-to-gateway propagation delay.

Aspect 4: The method of aspect 3, wherein the configuration information is provided in a system information broadcast transmission, or in UE-specific signaling.

Aspect 5: The method of any of aspects 3 through 4, wherein the configuration information indicates that the uplink timing is relative to the base station timing reference; and wherein the configuration information further provides a round trip delay offset associated with the base station and the satellite, and a round trip delay variation associated with the base station and the satellite.

Aspect 6: The method of any of aspects 3 through 5, wherein the configuration information indicates that the uplink timing is based on the satellite timing reference, and the uplink timing is determined based only on the UE-to-satellite propagation delay and a UE-to-satellite propagation delay variation.

Aspect 7: The method of any of aspects 1 through 6, further comprising: identifying a validity time associated with the round trip delay information; and monitoring for updated round trip delay information responsive to an expiration of the validity time.

Aspect 8: The method of aspect 7, wherein the validity time starts when an SIB that contains the round trip delay information is acquired, and the monitoring for the updated round trip delay information comprises acquiring another instance of the SIB.

Aspect 9: The method of any of aspects 1 through 8, wherein the round trip delay information includes an initial value of the propagation delay for use in an initial access procedure, and the propagation delay variation is determined subsequent to the initial access procedure based on a duration in which a plurality of propagation delays are determined.

Aspect 10: The method of any of aspects 1 through 9, wherein the round trip delay information includes a satellite-to-base station propagation delay, and the UE determines a UE-to-satellite propagation delay, and the propagation delay variation is determined based on a duration in which a plurality of propagation delays are determined.

Aspect 11: The method of aspect 10, wherein the round trip delay information further includes the UE-to-satellite propagation delay.

Aspect 12: The method of aspect 11, wherein a mid-point of a transmission beam coverage area for a transmission beam used for communications with the UE is considered as a location of the UE for the UE-to-satellite propagation delay.

Aspect 13: The method of any of aspects 1 through 12, wherein the round trip delay information includes a base station-to-UE propagation delay for use in an initial access procedure, and the propagation delay variation is determined subsequent to the initial access procedure.

Aspect 14: The method of any of aspects 1 through 13, wherein the identifying further comprises: receiving a broadcast transmission that includes the round trip delay information, and wherein the broadcast transmission is periodically broadcast by the base station or another network node at a first periodicity.

Aspect 15: The method of any of aspects 1 through 14, wherein the round trip delay information includes the propagation delay and the propagation delay variation.

Aspect 16: The method of aspect 15, wherein the propagation delay is provided in broadcast signaling, and the propagation delay variation is provided in dedicated signaling to the UE.

Aspect 17: The method of any of aspects 1 through 16, wherein the round trip delay information includes an indication of the propagation delay and is provided periodically by the base station, and the propagation delay variation is determined based at least in part on differences between two or more instances of the propagation delay provided by the base station.

Aspect 18: The method of any of aspects 1 through 17, wherein the identifying comprises: receiving an indication of a base station location in the round trip delay information; and determining one or more of the propagation delay or the propagation delay variation based at least in part on the base station location, a UE location, and a satellite location.

Aspect 19: The method of aspect 18, wherein the base station location is provided in radio resource control signaling when the UE is in a connected mode with the base station.

Aspect 20: The method of any of aspects 18 through 19, wherein the base station location is a virtual geo-location that allows for determination of the propagation delay variation, and is provided in dedicated signaling to the UE or in broadcast signaling from the base station.

Aspect 21: A method for wireless communication at a base station, comprising: identifying round trip delay information associated with a propagation delay for communications with at least a first UE via a satellite; determining configuration information based at least in part on the round trip delay information, the configuration information indicating that the first UE is to identify an uplink timing for uplink communications to the base station via the satellite based on a satellite timing reference or a base station timing reference, wherein the uplink timing is based at least in part on the propagation delay and a propagation delay variation, and wherein the propagation delay variation is based at least in part on movement of the satellite relative to the UE or movement of the satellite relative to both the UE and the base station; and transmitting the configuration information to at least the first UE.

Aspect 22: The method of aspect 21, wherein the configuration information comprises a variable that indicates whether the uplink timing is based on the satellite timing reference and a UE-to-satellite propagation delay, or is based on the base station timing reference and a UE-to-base station propagation delay based at least in part on a value of the variable.

Aspect 23: The method of aspect 22, wherein the configuration information is transmitted in a system information broadcast transmission from the base station, or in UE-specific signaling to the first UE.

Aspect 24: The method of any of aspects 22 through 23, wherein the configuration information indicates that the uplink timing is relative to the base station timing reference; and wherein the configuration information further provides a round trip delay offset associated with the base station and the satellite, and a round trip delay variation associated with the base station and the satellite.

Aspect 25: The method of any of aspects 22 through 24, wherein the configuration information indicates that the uplink timing is based on the satellite timing reference, and the uplink timing is determined based only on the UE-to-satellite propagation delay.

Aspect 26: The method of any of aspects 21 through 25, further comprising: periodically transmitting instances of the configuration information with updated round trip delay information.

Aspect 27: The method of any of aspects 21 through 26, wherein the round trip delay information includes an initial value of the propagation delay for use in an initial access procedure, and the propagation delay variation is determined subsequent to the initial access procedure based on a duration in which a plurality of propagation delays are determined.

Aspect 28: An apparatus for wireless communication at a UE, comprising a processor; memory coupled with the processor; and instructions stored in the memory and executable by the processor to cause the apparatus to perform a method of any of aspects 1 through 20.

Aspect 29: An apparatus for wireless communication at a UE, comprising at least one means for performing a method of any of aspects 1 through 20.

Aspect 30: A non-transitory computer-readable medium storing code for wireless communication at a UE, the code comprising instructions executable by a processor to perform a method of any of aspects 1 through 20.

Aspect 31: An apparatus for wireless communication at a base station, comprising a processor; memory coupled with the processor; and instructions stored in the memory and executable by the processor to cause the apparatus to perform a method of any of aspects 21 through 27.

Aspect 32: An apparatus for wireless communication at a base station, comprising at least one means for performing a method of any of aspects 21 through 27.

Aspect 33: A non-transitory computer-readable medium storing code for wireless communication at a base station, the code comprising instructions executable by a processor to perform a method of any of aspects 21 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying, based at least in part on round trip delay information received from a network, a propagation delay for communications between the UE and a network device via a satellite;
    receiving an indication of a validity time associated with the round trip delay information;
    determining, based at least in part on the propagation delay and a propagation delay variation, an uplink timing for initiating an uplink communication to the network device via the satellite, wherein the uplink timing is determined relative to a satellite timing reference or a network device timing reference, and wherein the propagation delay variation is based at least in part on movement of the satellite relative to the UE or movement of the satellite relative to both the UE and the network device;

transmitting the uplink communication to the network device via the satellite based at least in part on the uplink timing; and monitoring for updated round trip delay information responsive to an expiration of the validity time.

2. The method of claim 1, further comprising:
determining a first portion of the propagation delay and a first propagation delay variation for a UE-to-satellite link;
determining a second portion of the propagation delay and a second propagation delay variation for a satellite-to-network device link; and
wherein the propagation delay for communications between the UE and the network device is based at least in part on one or more of the first portion of the propagation delay, the first propagation delay variation, the second portion of the propagation delay, or the second propagation delay variation.

3. The method of claim 1, further comprising:
receiving configuration information that indicates whether the uplink timing is based on the satellite timing reference and a UE-to-satellite propagation delay, or is based on the network device timing reference and a UE-to-gateway propagation delay.

4. The method of claim 3, wherein the configuration information is provided in a system information broadcast transmission, or in UE-specific signaling.

5. The method of claim 3, wherein:
the configuration information indicates that the uplink timing is relative to the network device timing reference; and
the configuration information further provides a round trip delay offset associated with the network device and the satellite, and a round trip delay variation associated with the network device and the satellite.

6. The method of claim 3, wherein the configuration information indicates that the uplink timing is based on the satellite timing reference, and wherein the uplink timing is determined based only on the UE-to-satellite propagation delay and a UE-to-satellite propagation delay variation.

7. The method of claim 1, further comprising:
identifying the validity time associated with the round trip delay information based at least in part on receiving the indication.

8. The method of claim 7, wherein the validity time starts when a system information block (SIB) that contains the round trip delay information is acquired, and wherein the monitoring for the updated round trip delay information comprises acquiring another instance of the SIB.

9. The method of claim 1, wherein the round trip delay information includes an initial value of the propagation delay for use in an initial access procedure, and wherein the propagation delay variation is determined subsequent to the initial access procedure based on a duration in which a plurality of propagation delays are determined.

10. The method of claim 1, wherein the round trip delay information includes a satellite-to-network device propagation delay, and wherein the UE determines a UE-to-satellite propagation delay, and wherein the propagation delay variation is determined based on a duration in which a plurality of propagation delays are determined.

11. The method of claim 10, wherein the round trip delay information further includes the UE-to-satellite propagation delay.

12. The method of claim 11, wherein a mid-point of a transmission beam coverage area for a transmission beam used for communications with the UE is considered as a location of the UE for the UE-to-satellite propagation delay.

13. The method of claim 1, wherein the round trip delay information includes a network device-to-UE propagation delay for use in an initial access procedure, and wherein the propagation delay variation is determined subsequent to the initial access procedure.

14. The method of claim 1, wherein the identifying further comprises:
receiving a broadcast transmission that includes the round trip delay information, and wherein the broadcast transmission is periodically broadcast by the network device or another network node at a first periodicity.

15. The method of claim 1, wherein the round trip delay information includes the propagation delay and the propagation delay variation.

16. The method of claim 15, wherein the propagation delay is provided in broadcast signaling, and the propagation delay variation is provided in dedicated signaling to the UE.

17. The method of claim 1, wherein the round trip delay information includes an indication of the propagation delay and is provided periodically by the network device, and wherein the propagation delay variation is determined based at least in part on differences between two or more instances of the propagation delay provided by the network device.

18. The method of claim 1, wherein the identifying comprises:
receiving an indication of a network device location in the round trip delay information; and
determining one or more of the propagation delay or the propagation delay variation based at least in part on the network device location, a UE location, and a satellite location.

19. The method of claim 18, wherein the network device location is provided in radio resource control signaling when the UE is in a connected mode with the network device.

20. The method of claim 18, wherein the network device location is a virtual geo-location that allows for determination of the propagation delay variation, and is provided in dedicated signaling to the UE or in broadcast signaling from the network device.

21. A method for wireless communication at a network device, comprising:
identifying round trip delay information associated with a propagation delay for communications with at least a first user equipment (UE) via a satellite;
determining configuration information based at least in part on the round trip delay information, the configuration information indicating that the first UE is to identify an uplink timing for uplink communications to the network device via the satellite based on a satellite timing reference or a network device timing reference, wherein the uplink timing is based at least in part on the propagation delay and a propagation delay variation, and wherein the propagation delay variation is based at least in part on movement of the satellite relative to the UE or movement of the satellite relative to both the UE and the network device;
transmitting the configuration information and the round trip delay information to at least the first UE; and
transmitting an indication of a validity time associated with the round trip delay information.

22. The method of claim 21, wherein the configuration information comprises a variable that indicates whether the uplink timing is based on the satellite timing reference and a UE-to-satellite propagation delay, or is based on the network device timing reference and a UE-to-network device propagation delay based at least in part on a value of the variable.

23. The method of claim 22, wherein the configuration information is transmitted in a system information broadcast transmission from the network device, or in UE-specific signaling to the first UE.

24. The method of claim 22, wherein:
the configuration information indicates that the uplink timing is relative to the network device timing reference; and
the configuration information further provides a round trip delay offset associated with the network device and the satellite, and a round trip delay variation associated with the network device and the satellite.

25. The method of claim 22, wherein the configuration information indicates that the uplink timing is based on the satellite timing reference, and wherein the uplink timing is determined based only on the UE-to-satellite propagation delay.

26. The method of claim 21, further comprising:
periodically transmitting subsequent instances of the configuration information with updated round trip delay information.

27. The method of claim 21, wherein the round trip delay information includes an initial value of the propagation delay for use in an initial access procedure, and wherein the propagation delay variation is determined subsequent to the initial access procedure based on a duration in which a plurality of propagation delays are determined.

28. An apparatus for wireless communication at a user equipment (UE), comprising:
a processor,
memory coupled with the processor; and
instructions stored in the memory and executable by the processor to cause the apparatus to:
identify, based at least in part on round trip delay information received from a network, a propagation delay for communications between the UE and a network device via a satellite;
receive an indication of a validity time associated with the round trip delay information;
determine, based at least in part on the propagation delay and a propagation delay variation, an uplink timing for initiating an uplink communication to the network device via the satellite, wherein the uplink timing is determined relative to a satellite timing reference or a network device timing reference, and wherein the propagation delay variation is based at least in part on movement of the satellite relative to the UE or movement of the satellite relative to both the UE and the network device;
transmit the uplink communication to the network device via the satellite based at least in part on the uplink timing; and
monitor for updated round trip delay information responsive to an expiration of the validity time.

29. The apparatus of claim 28, wherein the instructions are further executable by the processor to cause the apparatus to:
receive configuration information that indicates whether the uplink timing is based on the satellite timing reference and a UE-to-satellite propagation delay, or is based on the network device timing reference and a UE-to-gateway propagation delay.

30. The apparatus of claim 29, wherein the configuration information indicates that the uplink timing is based on the satellite timing reference, and wherein the uplink timing is determined based only on the UE-to-satellite propagation delay and a UE-to-satellite propagation delay variation.

31. The apparatus of claim 28, wherein the instructions are further executable by the processor to cause the apparatus to:
determine a first portion of the propagation delay and a first propagation delay variation for a UE-to-satellite link; and
determine a second portion of the propagation delay and a second propagation delay variation for a satellite-to-network device link; and
wherein the propagation delay for communications between the UE and the network device is based at least in part on one or more of the first portion of the propagation delay, the first propagation delay variation, the second portion of the propagation delay, or the second propagation delay variation.

32. The apparatus of claim 28, wherein the instructions are further executable by the processor to cause the apparatus to:
identify the validity time associated with the round trip delay information based at least in part on receiving the indication.

33. The apparatus of claim 32, wherein the validity time starts when a system information block (SIB) that contains the round trip delay information is acquired, and wherein the monitoring for the updated round trip delay information comprises acquiring another instance of the SIB.

34. The apparatus of claim 28, wherein the round trip delay information includes an initial value of the propagation delay for use in an initial access procedure, and wherein the propagation delay variation is determined subsequent to the initial access procedure based on a duration in which a plurality of propagation delays are determined.

35. The apparatus of claim 28, wherein the round trip delay information includes a satellite-to-network device propagation delay, and wherein the UE determines a UE-to-satellite propagation delay, and wherein the propagation delay variation is determined based on a duration in which a plurality of propagation delays are determined.

36. The apparatus of claim 28, wherein the round trip delay information includes a network device-to-UE propagation delay for use in an initial access procedure, and wherein the propagation delay variation is determined subsequent to the initial access procedure.

37. The apparatus of claim 28, wherein the round trip delay information includes the propagation delay and the propagation delay variation.

38. The apparatus of claim 37, wherein the propagation delay is provided in broadcast signaling, and the propagation delay variation is provided in dedicated signaling to the UE.

39. The apparatus of claim 28, wherein the round trip delay information includes an indication of the propagation delay and is provided periodically by the network device, and wherein the propagation delay variation is determined based at least in part on differences between two or more instances of the propagation delay provided by the network device.

40. The apparatus of claim 28, wherein to identify, the instructions are further executable by the processor to cause the apparatus to:
receive an indication of a network device location in the round trip delay information; and determine one or more of the propagation delay or the propagation delay variation based at least in part on the network device location, a UE location, and a satellite location.

41. An apparatus for wireless communication at a network device, comprising:
a processor;
memory coupled with the processor; and
instructions stored in the memory and executable by the processor to cause the apparatus to:
identify round trip delay information associated with a propagation delay for communications with at least a first user equipment (UE) via a satellite;
determine configuration information based at least in part on the round trip delay information, the configuration information indicating that the first UE is to identify an uplink timing for uplink communications to the network device via the satellite based on a satellite timing reference or a network device timing reference, wherein the uplink timing is based at least in part on the propagation delay and a propagation delay variation, and wherein the propagation delay variation is based at least in part on movement of the satellite relative to the UE or movement of the satellite relative to both the UE and the network device;
transmit the configuration information and the round trip delay information to at least the first UE; and
transmit an indication of a validity time associated with the round trip delay information.

42. The apparatus of claim 41, wherein the configuration information indicates that the uplink timing is based on the satellite timing reference, and wherein the uplink timing is determined based only on the UE-to-satellite propagation delay.

43. The apparatus of claim 41, wherein the round trip delay information includes an initial value of the propagation delay for use in an initial access procedure, and wherein the propagation delay variation is determined subsequent to the initial access procedure based on a duration in which a plurality of propagation delays are determined.

* * * * *